United States Patent
Yasumura

(10) Patent No.: US 7,388,760 B2
(45) Date of Patent: Jun. 17, 2008

(54) SWITCHING POWER SUPPLY CIRCUIT

(75) Inventor: Masayuki Yasumura, Kanagawa (JP)

(73) Assignee: Sony Corporation (JP)

( * ) Notice: Subject to any disclaimer, the term of this patent is extended or adjusted under 35 U.S.C. 154(b) by 78 days.

(21) Appl. No.: 11/324,608

(22) Filed: Jan. 3, 2006

(65) Prior Publication Data
US 2006/0164870 A1 Jul. 27, 2006

(30) Foreign Application Priority Data
Jan. 6, 2005 (JP) ............................ P2005-001521

(51) Int. Cl.
H02M 3/335 (2006.01)
(52) U.S. Cl. ......................................... 363/17; 363/132
(58) Field of Classification Search .................... 363/17, 363/24, 25, 26, 124, 15, 16, 21.02, 97, 98, 363/131, 132
See application file for complete search history.

(56) References Cited

U.S. PATENT DOCUMENTS

| | | | |
|---|---|---|---|
| 3,579,078 A * | 5/1971 | Cronin et al. ................. | 363/17 |
| 4,005,359 A * | 1/1977 | Smoot ......................... | 324/230 |
| 4,128,868 A * | 12/1978 | Gamble ....................... | 363/26 |
| 5,274,543 A | 12/1993 | Loftus, Jr. | |
| 5,442,540 A * | 8/1995 | Hua et al. ..................... | 363/98 |
| 5,805,432 A * | 9/1998 | Zaitsu et al. .................. | 363/16 |
| 5,969,954 A * | 10/1999 | Zaitsu .......................... | 363/16 |
| 6,285,567 B1 | 9/2001 | Kennedy | |
| 6,310,792 B1 | 10/2001 | Drobnik | |
| 6,366,476 B1 | 4/2002 | Yasumura et al. | |
| 6,483,721 B2 | 11/2002 | Terashi et al. | |
| 6,515,875 B2 | 2/2003 | Yasumura et al. | |
| 6,583,999 B1 | 6/2003 | Spindler et al. | |
| 6,654,259 B2 | 11/2003 | Koshita et al. | |
| 6,687,137 B1 | 2/2004 | Yasumura et al. | |
| 6,831,846 B2 | 12/2004 | Yasumura et al. | |
| 6,930,893 B2 | 8/2005 | Vinciarelli | |
| 6,934,167 B2 | 8/2005 | Jang et al. | |
| 7,054,167 B2 | 5/2006 | Yasumura et al. | |
| 2004/0145929 A1* | 7/2004 | Mihara et al. ................. | 363/98 |

FOREIGN PATENT DOCUMENTS

| | | |
|---|---|---|
| JP | 06-327246 A | 11/1994 |
| JP | 2000-134925 A | 5/2000 |
| JP | 2000-152617 A | 5/2000 |
| JP | 2003-235259 A | 8/2003 |
| JP | 2004-194105 A | 7/2004 |

* cited by examiner

Primary Examiner—Matthew V. Nguyen
Assistant Examiner—Nguyen Tran
(74) Attorney, Agent, or Firm—Lerner, David, Littenberg, Krumholz & Mentlik, LLP

(57) ABSTRACT

A wide-range compatible switching power supply circuit employs switching frequency varying control and allows enhancement of its AC to DC power conversion efficiency when a large AC input voltage is used. A coupled resonant circuit employing electromagnetic coupling by an isolation converter transformer is formed by providing a series resonant circuit both on the primary side and on the secondary side of the transformer. In order to achieve a unimodal output characteristic in the coupled resonant circuit, the length of a gap formed in a core of the isolation converter transformer is set to about 2.0 mm, and a coupling coefficient is set to about 0.8 or less. Thus, the switching frequency variable control range can be narrowed, which allows a wide-range compatible configuration. In addition, resonant frequencies of primary-side and secondary-side resonant circuits are set so that a requisite phase shift arises between a primary-side series resonant current and a secondary-side rectified current at least when an AC input voltage is 100 V and the load power is the maximum load power. Thus, the AC to DC power conversion efficiency when the AC input voltage VAC is 230 V can be enhanced.

8 Claims, 13 Drawing Sheets

VAC=100V

Pomax=200W    Pomin=0W

VAC=230V

Pomax=200W    Pomin=0W

US 7,388,760 B2

SWITCHING POWER SUPPLY CIRCUIT

CROSS REFERENCE TO RELATED APPLICATIONS

The present application claims priority from Japanese Patent Application No. JP 2005-001521 filed on Jan. 6, 2005, the disclosure of which is hereby incorporated by reference herein.

BACKGROUND OF THE INVENTION

The present invention relates to a switching power supply circuit included in various electronic apparatuses as a power supply.

The present assignee has proposed various power supply circuits including a resonant converter on the primary side thereof. Japanese Patent Laid-open No. 2003-235259 discloses one example of the proposed power supply circuits.

FIG. 12 is a circuit diagram illustrating one example of a switching power supply circuit that includes a resonant converter and is constructed based on any of the inventions that have been filed by the present assignee.

The switching converter in the power supply circuit shown in FIG. 12 has a configuration in which a separately-excited current resonant converter constructed by half-bridge connection is combined with a partial voltage resonant circuit that performs voltage resonant operation only at the time of turn-off in the switching.

In the power supply circuit in FIG. 12, coupled to a commercial alternating-current power supply AC is a common mode noise filter formed of two filter capacitors CL and one common mode choke coil CMC.

As a rectifying and smoothing circuit for producing a DC input voltage from an AC input voltage VAC from the commercial power supply AC, a full-wave rectifier circuit formed of a bridge rectifier circuit Di and a smoothing capacitor Ci are provided downstream from the common mode noise filter.

The rectified output from the bridge rectifier circuit Di is charged in the smoothing capacitor Ci, and thus obtained across the smoothing capacitor Ci is a rectified and smoothed voltage Ei (DC input voltage) with the same level as that of the AC input voltage VAC.

As a current resonant converter that is fed with the DC input voltage and implements switching, a switching circuit system is provided in which two switching elements Q1 and Q2 formed of MOS-FETs are connected to each other by half-bridge connection as shown in the drawing. Damper diodes DD1 and DD2 formed of body diodes are connected in parallel with the channel between the drain and source of the switching elements Q1 and Q2, respectively, with having the anode-to-cathode direction indicated in the drawing.

In addition, a partial resonant capacitor Cp is connected in parallel with the channel between the drain and source of the switching element Q2. The capacitance of the partial resonant capacitor Cp and a leakage inductance L1 of a primary winding N1 form a parallel resonant circuit (partial voltage resonant circuit). This partial voltage resonant circuit allows partial voltage resonant operation in which voltage resonance arises only when the switching elements Q1 and Q2 are turned off.

The power supply circuit is provided with an oscillation and drive circuit 2 formed of e.g. general-purpose ICs in order to switching-drive the switching elements Q1 and Q2. The oscillation and drive circuit 2 includes an oscillation circuit and a drive circuit, and applies a drive signal (gate voltage) with a requisite frequency to the gates of the switching elements Q1 and Q2. Thus, the switching elements Q1 and Q2 implement switching operation so that they are alternately turned on/off with the requisite switching frequency.

An isolation converter transformer PIT (Power Isolation Transformer) transmits switching outputs from the switching elements Q1 and Q2 to the secondary side.

One end of the primary winding N1 in the isolation converter transformer PIT is coupled via a primary-side series resonant capacitor C1 to the connecting node (switching output node) between the source of the switching element Q1 and the drain of the switching element Q2, which allows acquisition of the switching outputs.

The other end of the primary winding N1 is connected to the primary-side ground as shown in the drawing.

The series resonant capacitor C1 and the primary winding N1 are connected in series. The capacitance of the series resonant capacitor C1 and the leakage inductance L1 of the primary winding N1 (series resonant winding) in the isolation converter transformer PIT form a primary-side series resonant circuit that offers current resonant operation as the operation of the switching converter.

According to the above description, the primary-side switching converter shown in FIG. 12 offers current resonant operation by the primary-side series resonant circuit (L1-C1) and partial voltage resonant operation by the above-described partial voltage resonant circuit (Cp//L1).

That is, the power supply circuit shown in the drawing employs a configuration in which a resonant circuit that offers a resonant converter as the primary-side switching converter is combined with another resonant circuit. Hereinafter, such a switching converter is referred to as a complex resonant converter.

The isolation converter transformer PIT is constructed of an EE-core that is formed by combining E-cores composed of a ferrite material for example, although the illustration thereof in this drawing is omitted. Furthermore, the primary winding N1 and a secondary winding N2 are wound around the center magnetic leg of the EE-core, with the winding part being divided into the primary side and secondary side.

In addition, a gap with a gap length of 1.0 mm or smaller is provided in the center leg of the EE-core in the isolation converter transformer PIT, so that a coupling coefficient of about 0.80 to 0.90 is obtained between the primary winding N1 and the secondary winding N2.

In practice, a coupling coefficient k of about 0.85 is obtained under the following conditions: a gap G is about 0.8 mm, and the numbers of turns of the primary winding N1 and the secondary winding N2 are 20 T (turn) and 50 T (25 T+25 T), respectively.

The secondary winding N2 in the isolation converter transformer PIT is provided with a center tap connected to the secondary-side ground as shown in the drawing, which divides the secondary winding N2 into a secondary winding portion N2A and a secondary winding portion N2B. In addition, rectifier diodes Do1 and Do2 are connected in series to the secondary winding portion N2A and the secondary winding portion N2B, respectively, and a smoothing capacitor Co for smoothing a rectified output from the rectifier diodes Do1 and Do2 is provided. Thus, a full-wave center-tap rectifier circuit is achieved.

Accordingly, as a voltage across the smoothing capacitor Co, a secondary-side DC output voltage Eo is obtained that is a DC voltage with the same level as that of an alternating voltage induced in each secondary winding portion. The secondary-side DC output voltage Eo is supplied to a main load (not shown) as a main DC voltage, and is branched and input to a control circuit 1 as a detected voltage for constant-voltage control.

The control circuit 1 outputs to the oscillation and drive circuit 2 a control signal as a voltage or current of which level is varied depending on the level of the secondary-side DC output voltage Eo.

Based on the control signal input from the control circuit 1, the oscillation and drive circuit 2 varies the frequency of an oscillation signal generated by the oscillation circuit in the oscillation and drive circuit 2, to thereby change the frequency of a switching drive signal applied to the gates of the switching elements Q1 and Q2. Thus, the switching frequency is varied. If the switching frequency of the switching elements Q1 and Q2 is thus varied depending on the level of the secondary-side DC output voltage Eo, the resonant impedance of the primary-side series resonant circuit changes and therefore energy is also changed that is transmitted from the primary winding N1, which forms the primary-side series resonant circuit, to the secondary side. Accordingly, the level of the secondary-side DC output voltage Eo is also varied. Thus, constant-voltage control for the secondary-side DC output voltage Eo is achieved.

Hereinafter, such a constant-voltage control method in which the switching frequency is varied for stabilizing the output voltage is referred to as a switching frequency control method.

FIG. 13 is a waveform diagram for showing the operations of major parts in the power supply circuit of FIG. 12. This diagram shows the operations when the load power Po is 200 W and 0 W, respectively, in the circuit shown in FIG. 12. It should be noted that the load power Po of 200 W is the maximum load power (Pomax) of the circuit in FIG. 12, and 0 W is the minimum load power (Pomin).

Furthermore, in FIG. 13, the AC input voltage VAC is kept constant at 100 V as the input voltage condition. As the secondary-side DC output voltage Eo, a voltage of 100 V or larger is produced.

In order to achieve the above-described conditions of the load power, input voltage and secondary-side DC output voltage, elements having the following characteristics are selected as the major parts in the circuit in FIG. 12:
the isolation converter transformer PIT having a gap length of 0.8 mm and a coupling coefficient k of about 0.85
the primary winding N1 of which number of turns is 20 T
the secondary winding N2 of which number of turns is 50 T (25 T+25 T, across the center tap)
the primary-side series resonant capacitor C1 having a capacitance of 0.068 µF and
the partial resonant capacitor Cp having a capacitance of 1000 pF.

Referring to FIG. 13, a rectangular waveform voltage V1 is a voltage across the switching element Q2, and indicates the on/off timings of the switching element Q2.

The period during which the voltage V1 is at the 0 level corresponds to the on-period during which the switching element Q2 is in the on-state. In this on-period, a switching current IQ2 having the illustrated waveform flows through the switching circuit system composed of the switching element Q2 and the clamp diode DD2. In contrast, the period during which the voltage V1 is clamped at the level of the rectified and smoothed voltage Ei corresponds to the period during which the switching element Q2 is in the off-state. In this off-period, the switching current IQ2 is at the 0 level as shown in FIG. 13.

In addition, although not illustrated, a voltage across the other switching element Q1 and a switching current flowing in the other switching circuit system (Q1, DD1) have a waveform obtained by shifting by 180° the phase of the waveform of the voltage V1 and the switching current IQ2, respectively. That is, as described above, the switching elements Q1 and Q2 implement switching operation with timings at which they are alternately turned on/off.

A primary-side series resonant current Io (not shown) flows through the primary-side series resonant circuit (C1-N1 (L1)) with having a waveform resulting from synthesis of the waveforms of the switching currents flowing in these switching circuits (Q1, DD1) and (Q2, DD2).

A comparison between the waveform of the voltage V1 when the load power Po is 200 W and that when it is 0 W makes it apparent that the switching frequency of the primary side is controlled so that the switching frequency be lower when the secondary-side DC output voltage Eo is supplied to a heavier load (Po=200 W) than that when it is supplied to a lighter load (Po=0 W). Specifically, in response to lowering of the level of the secondary-side DC output voltage Eo due to a heavy load, the switching frequency is decreased. In contrast, in response to a rise of the level of the secondary-side DC output voltage Eo due to a light load, the switching frequency is increased. Such switching frequency changes indicate the fact that constant-voltage control operation by upper-side control is carried out as the switching frequency control method.

In this power supply circuit, as shown in FIG. 13, the peak level of the switching current IQ2 when the load power Po is 200 W is 5.6 Ap while that when the load power Po is 0 W is 0.8 Ap.

The above-described operation on the primary side induces an alternating voltage V2 having the illustrated waveform in the secondary winding N2 of the isolation converter transformer PIT. In the half cycles during which the alternating voltage V2 is positive, a current flows through the rectifier diode Do1 on the secondary side. In contrast, in the half cycles during which the alternating voltage V2 is negative (i.e., the half cycles during which an alternating voltage excited in the secondary winding portion N2B is positive), a current flows through the rectifier diode Do2. Thus, in the full-wave center-tap rectifier circuit on the secondary side, a rectified output current I2 flowing between the center tap of the secondary winding N2 and the secondary-side ground has a waveform of which peak levels appear with the same cycle as that with which the positive and negative peak levels of the alternating voltage V2 appear as shown in FIG. 13.

The peak level of the alternating voltage V2 is equal to the level of the secondary-side DC output voltage Eo. In FIG. 13, the peak levels of the rectified output current I2 in the respective half cycles are different: 3 Ap and 2 Ap. The reason for this will be described later.

When a resonant converter configuration is adopted that stabilizes the secondary-side DC output voltage with a switching frequency control method like the power supply circuit in FIG. 12, there is a tendency that the variable control range of the switching frequency for stabilization is a comparatively wide range.

This respect will be with reference to FIG. 14. FIG. 14 shows the constant-voltage control characteristic of a conventional power supply circuit that employs a switching frequency control method for stabilizing its output voltage. The characteristic is indicated as the relationship between a switching frequency fs and the level of the secondary-side DC output voltage Eo.

The following description for this diagram is based on the premise that the power supply circuit of FIG. 12 employs a so-called upper-side control method as a switching frequency control method. The term upper-side control refers to a control method in which the switching frequency is changed within a range of frequencies higher than a resonant frequency fo of the primary-side series resonant circuit, and a resonant impedance change arising from the switching frequency change is utilized to control the level of the secondary-side DC output voltage Eo.

In general, the resonant impedance of a series resonant circuit becomes lowest when the frequency is the resonant frequency fo. Accordingly, the relationship between the secondary-side DC output voltage Eo and the switching frequency fs in the upper-side control is as follows: a switching frequency fs closer to the resonant frequency fo leads to a higher level of the secondary-side DC output voltage Eo while one remoter from the resonant frequency fo leads to a lower level.

Therefore, under the condition that the load power Po is constant, the function of level of the secondary-side DC output voltage Eo depending on the switching frequency fs draws a quadratic curve in which its peak appears when the switching frequency fs is the same as the resonant frequency fo of the primary-side series resonant circuit, and the level decreases as the switching frequency fs is remoter from the resonant frequency fo.

In addition, for the same switching frequency fs, the level of the secondary-side DC output voltage Eo is different depending on the load power Po. Specifically, the voltage level when the load power is the maximum load power Pomax is lower by a certain value than that when the load power is the minimum load power Pomin. That is, under the condition that the switching frequency fs is fixed, a heavier load results in a lower level of the secondary-side DC output voltage Eo.

When it is aimed to, under such a characteristic, stabilize the secondary-side DC output voltage Eo at a voltage level tg by upper-side control, the requisite variable range (requisite control range) of the switching frequency is a range indicated by Δfs.

In an actual power supply circuit shown in FIG. 12, for example, constant-voltage control is implemented so that the secondary-side DC output voltage Eo is stabilized at 135 V by a switching frequency control method, under the following conditions: an input variation range of 85 V to 120 V of the AC input voltage VAC as an AC 100 V-system input; and the maximum and minimum load powers Pomax and Pomin of 200 W and 0 W (no load), respectively, of the secondary-side DC output voltage Eo, which is a main DC voltage.

Under these conditions, the variable range of the switching frequency fs required for constant-voltage control in a conventional typical power supply circuit is from about 80 kHz to about 200 kHz or higher, i.e., Δfs is 120 kHz or higher. This range is considerably wide.

As a power supply circuit, a so-called wide-range compatible one is known that can operate compatibly with an AC input voltage range of 85 V to 288 V for example, so that it can be used both in areas employing the input voltage AC 100 V-system such as Japan and the United States and in areas employing the AC 200 V-system such as Europe.

Consideration will be made below as to provision of a wide-range compatible configuration for a conventional power supply circuit that implements switching frequency control, typified by the power supply circuit in FIG. 12.

The wide-range compatible circuit can accept an AC input voltage range of 85 V to 288 V for example as described above. Therefore, compared with a single-range compatible one that can accept either one of the AC 100 V-system and the AC 200 V-system for example, the level variation range of the secondary-side DC output voltage Eo is larger. In order to implement constant-voltage control for the secondary-side DC output voltage Eo of which level variation range is wide due to such a wide AC input voltage range, a wide switching frequency control range is required. If a conventional power supply circuit has a switching frequency control range of 80 kHz to 200 kHz for an AC 100 V-system single range as described above, in order for the power supply circuit to have a wide-range compatible configuration, the switching frequency control range needs to be widened to a range of about 80 kHz to 500 kHz.

However, in a present IC (the oscillation and drive circuit 2) for driving switching elements, the upper limit of a possible drive frequency is about 200 kHz. Even if a switching drive IC capable of driving elements with the above-described high frequency can be formed and mounted, driving of switching elements with such a high frequency leads to a significantly low power conversion efficiency, and therefore this IC is impractical in an actual power supply circuit.

Accordingly, it has been thought that it is very difficult to achieve a wide-range compatible configuration in a conventional power supply circuit only by stabilizing operation by a switching frequency control method.

In addition, if the power supply circuit includes a full-wave center-tap rectifier circuit as its secondary-side rectifier circuit like one shown in FIG. 12, the switching frequency control range is further widened in particular.

In the full-wave center-tap rectifier circuit, the secondary winding N2 is center-tapped, and thus two secondary winding portions (N2A, N2B) are formed. In these two secondary winding portions N2A and N2B, in the periods of half cycles of one polarity (hereinafter, one half cycles) of an alternating voltage excited in the secondary winding N2, a rectified current flows through the secondary winding portion N2A, the rectifier diode Do1, the smoothing capacitor Co, and the secondary winding portion N2A in that order. In contrast, in the periods of half cycles of the other polarity (hereinafter, the other half cycles) of the alternating voltage, a rectified current flows through the secondary winding portion N2B, the rectifier diode Do2, the smoothing capacitor Co, and the secondary winding portion N2B in that order.

That is, in full-wave center-tap rectification, in the periods of one half cycles, a current flows through only one of the two secondary winding portions but does not flow through the other winding portion.

In such full-wave center-tap rectifying operation, a given electrostatic capacitance exists between the secondary winding portion N2A and the secondary winding portion N2B, which are each wound around a bobbin in the isolation converter transformer PIT.

The existence of the interwinding capacitance is equivalent to the state in which a capacitor Cp20 is connected in parallel with the secondary winding N2 on the secondary side of the isolation converter transformer PIT as shown in FIG. 12.

The connecting of the capacitor Cp20 in parallel with the secondary winding N2 results in formation of a parallel resonant circuit also on the secondary side, by the leakage inductance of the secondary winding N2 and the capacitance of the capacitor Cp20.

The capacitance of the capacitor Cp20 is determined depending on the number of strands in a litz line used for the secondary winding N2 and the window area of the bobbin around which the secondary winding N2 is wound. In the circuit of FIG. 12 involving the above-described conditions, this capacitance is about 100 pF to 500 pF, which is minute.

Since the parallel resonant circuit is thus formed also on the secondary side, an actual circuit of FIG. 12 involves, as a constant-voltage characteristic about the secondary-side DC output voltage Eo like that shown in FIG. 14, a characteristic shown in FIG. 15.

Referring to FIG. 15, in addition to a resonant frequency fo1 of the primary-side series resonant circuit, a resonant frequency fo2p of the secondary-side parallel resonant circuit exists since the parallel resonant circuit is formed also on the secondary side as described above.

When the load power is the minimum load power Pomin in particular, the existence of the different two resonant points results in, as a characteristic curve, a bimodal curve like the illustrated curve including two peaks: the peak corresponding to the primary-side resonant frequency fo1 and the peak corresponding to the secondary-side resonant frequency fo2p.

In this case, since the capacitance of the capacitor Cp20 is comparatively minute as described above, when there is a tendency toward a heavier load and thus the level of the secondary-side DC output voltage Eo is comparatively low, the secondary-side resonant point has no effect on the characteristic curve (see the characteristic curve when the load power is the maximum load power Pomax). However, when there arises a tendency toward a lighter heavy and thus the load state approaches no-load state, the level of the secondary-side DC output voltage Eo tends to sharply rise. This level rise yields a bimodal characteristic curve like the characteristic curve when the load power Po is 0 as the secondary-side resonant point is elicited.

A comparison between the bimodal characteristic curve and the characteristic curve in FIG. 14 when the load power Po is 0 W allows understanding of the tendency that, in the no-load state, the switching frequency in the bimodal curve of FIG. 15 is higher than that in a unimodal curve for the same output voltage level.

In addition, according to this tendency, the bimodal curve in FIG. 15 leads to a wider requisite control range Δfs of the switching frequency as is apparent from a comparison between two Δfs in FIGS. 14 and 15.

FIG. 16 is a diagram showing the variation characteristic of the switching frequency fs as a function of load in the circuit of FIG. 12, which includes a full-wave center-tap rectifier circuit as its secondary-side rectifier circuit.

According to this characteristic diagram, using a full-wave center-tap rectifier circuit leads to the tendency that the switching frequency sharply rises when the load power Po approaches 0 W due to the elicitation of the secondary-side resonant point as described above.

According to experiments, the switching frequency fs was about 75.8 kHz when the load power was the maximum load power Pomax. In contrast, when the load power was the minimum load power Pomin, the switching frequency fs rose to about 172.4 kHz.

As described above, if a full-wave center-tap rectifier circuit is formed on the secondary-side as a conventional power supply circuit configuration, the requisite control range Δfs is further widened since the existence of two resonant points due to the resonant circuits on the primary-side and secondary-side leads to the widening thereof.

This further widening of the requisite control range Δfs makes it almost impossible to achieve a wide-range compatible configuration.

Furthermore, a wide control range of the switching frequency also causes a problem that the high-speed response characteristic of stabilizing the secondary-side DC output voltage Eo is lowered.

Some electronic apparatuses involve operation in which the load condition varies in such a manner to be instantaneously switched between the maximum-load state and the almost-no-load state for example. Such load variation is referred to as switching load. A power supply circuit incorporated in such apparatuses needs to adequately stabilize its secondary-side DC output voltage even in response to the load variation called the switching load.

However, when the power supply circuit involves a wide control range of the switching frequency as described with reference to FIGS. 14 and 15, it takes a comparatively long time period for the circuit to vary its switching frequency to the frequency for achieving a requisite level of the secondary-side DC output voltage in response to load variation like the switching load. That is, an unfavorable result is obtained as the response characteristic of constant-voltage control.

In particular, the power supply circuit shown in FIG. 12 has such a switching frequency characteristic for constant-voltage control that the switching frequency greatly varies within a load power range of 0 W to about 25 W as shown in FIG. 16. This characteristic is disadvantageous as a constant-voltage control response characteristic against the switching load.

In addition, using a full-wave center-tap rectifier circuit as the secondary-side rectifier circuit like the circuit in FIG. 12 also leads to another problem that bias magnetization arises in the isolation converter transformer PIT in particular.

Specifically, of the secondary winding portions N2A and N2B, one winding portion is long while the other is short depending on which of two is first wound around the bobbin in the isolation converter transformer PIT. Due to this winding length difference, the coupling coefficient between the primary winding N1 and the secondary winding portion N2A is different from that between the primary winding N1 and the secondary winding portion N2B.

In an actual circuit of FIG. 12, the coupling coefficient k between the primary winding N1 and the secondary winding portion N2A is 0.86 while that between the primary winding N1 and the secondary winding portion N2B is 0.85. Thus, a difference arises between the leakage inductances of the respective winding portions. As a result, as shown in the waveform diagram of FIG. 13, the rectified output current I2 has a waveform in which peak levels in the respective half cycles are different from each other.

Since the peak levels of the rectified current in the respective half cycles are thus different, the peak levels of currents flowing through the rectifier diodes (Do1, Do2) on the secondary side are also different. As a result, the breakdown current level of one rectifier diode needs to be increased compared with the case in which rectified currents having the same peak level flow through the respective diodes. Therefore, a need arises to select a more expensive part with a higher breakdown current level than a part used when rectified currents have the same peak level, which imposes cost-up of fabrication of the power supply circuit.

In addition, the different peak levels of rectified currents also cause a problem that a bias arises between conductive losses in the rectifier diodes Do1 and Do2.

Actual experiments on the power supply circuit shown in FIG. 12 revealed that the AC to DC power conversion efficiency ηAC→DC was about 90.5% when the AC input voltage VAC was 100 V and the load power Po was 200 W. Moreover, the experiments offered a result that an AC input power Pin was about 2.6 W when the load power Po was 0 W.

SUMMARY OF THE INVENTION

In consideration of the above-described various problems, one aspect of the present invention provides a switching power supply circuit having the following configuration.

Specifically, the switching power supply circuit includes a switching unit including a switching element that receives a direct-current (DC) input voltage and performs a switching operation, the switching operation resulting in a switching output; and a switching drive unit that drives the switching element to perform the switching operation.

The switching power supply circuit also includes an isolation converter transformer having a core with a primary winding on a primary side and a secondary winding on a secondary side, the primary winding being supplied with the switching output of the switching operation, and the secondary winding having an alternating voltage induced therein by the primary winding.

In addition, the switching power supply circuit includes a primary-side series resonant circuit including a leakage inductance component of the primary winding and a capacitance of a primary-side series resonant capacitor connected in series with the primary winding for producing a first resonant frequency for making the switching unit operate on a current resonant basis.

The switching power supply circuit also includes a secondary-side series resonant circuit including a leakage inductance component of the secondary winding and a capacitance of a secondary-side series resonant capacitor connected in series with the secondary winding for producing a second resonant frequency.

Furthermore, the switching power supply circuit includes a secondary-side rectifying and smoothing unit that rectifies the alternating voltage induced in the secondary winding to produce a rectified voltage, and that smoothes the rectified voltage using a secondary-side smoothing capacitor to thereby produce a secondary-side DC output voltage.

The switching power supply circuit further includes a constant-voltage control unit that performs constant-voltage control of the secondary-side DC output voltage by controlling the switching drive unit according to a level of the secondary-side DC output voltage to thereby vary a switching frequency of the switching unit. The primary-side series resonant circuit and the secondary-side series resonant circuit form an electro-magnetically coupled resonant circuit.

The core of the isolation converter transformer has a gap formed in a predetermined position between the primary side and the secondary side, the gap having a length selected so that the electro-magnetically coupled resonant circuit has a unimodal output characteristic with respect to the input of a frequency signal having the switching frequency.

The first resonant frequency and the second resonant frequency are set so that a required phase shift arises between a primary-side series resonant current flowing through the primary-side series resonant circuit and a secondary-side rectified current flowing through the secondary side of the isolation converter transformer.

According to this configuration, a switching converter is employed for which a primary-side series resonant circuit is provided to offer current resonant operation as the switching operation of the primary side. In addition, a series resonant circuit is provided on the secondary side. Due to this configuration, the switching power supply circuit of this aspect of the invention includes a coupled resonant circuit employing electromagnetic coupling by the isolation converter transformer. On that basis, the gap length of a gap formed in a predetermined position in the core of the isolation converter transformer is set so that a coupling coefficient is obtained in which a sharp unimodal characteristic is achieved as an output characteristic with respect to a frequency signal (switching output) of the switching frequency, which is an input to the coupled resonant circuit. As a result, the switching frequency variable range (requisite control range) required for constant-voltage control can be narrowed compared with a circuit including a series resonant circuit only on the primary side.

In addition, since the first and second resonant frequencies are designed as described above, the peak level of the primary-side series resonant current when a large AC input voltage (the AC 200 V-system) is employed can be reduced, which enhances the power conversion efficiency when a large AC input voltage is used in particular.

As described above, according to this aspect of the present invention, the switching frequency variable control range (requisite control range) required for constant-voltage control can be narrowed effectively. Therefore, a wide-range compatible power supply circuit can be achieved only by stabilizing operation by switching frequency control.

Furthermore, since the switching frequency control range is narrowed, the responsiveness of constant-voltage control can be enhanced, which allows more adequate stabilization of the secondary-side DC output voltage.

Moreover, the first and second resonant frequencies are designed so that a phase shift arises between the primary-side series resonant current and the secondary winding current. Thus, the level of the primary-side series resonant current when a large AC input voltage is used is suppressed, which enhances the power conversion efficiency when a large AC input voltage is used.

DETAILED DESCRIPTION

Switching power supply circuits as best modes (referred to also as embodiments hereinafter) for carrying out the present invention will be described below.

Figure 1:
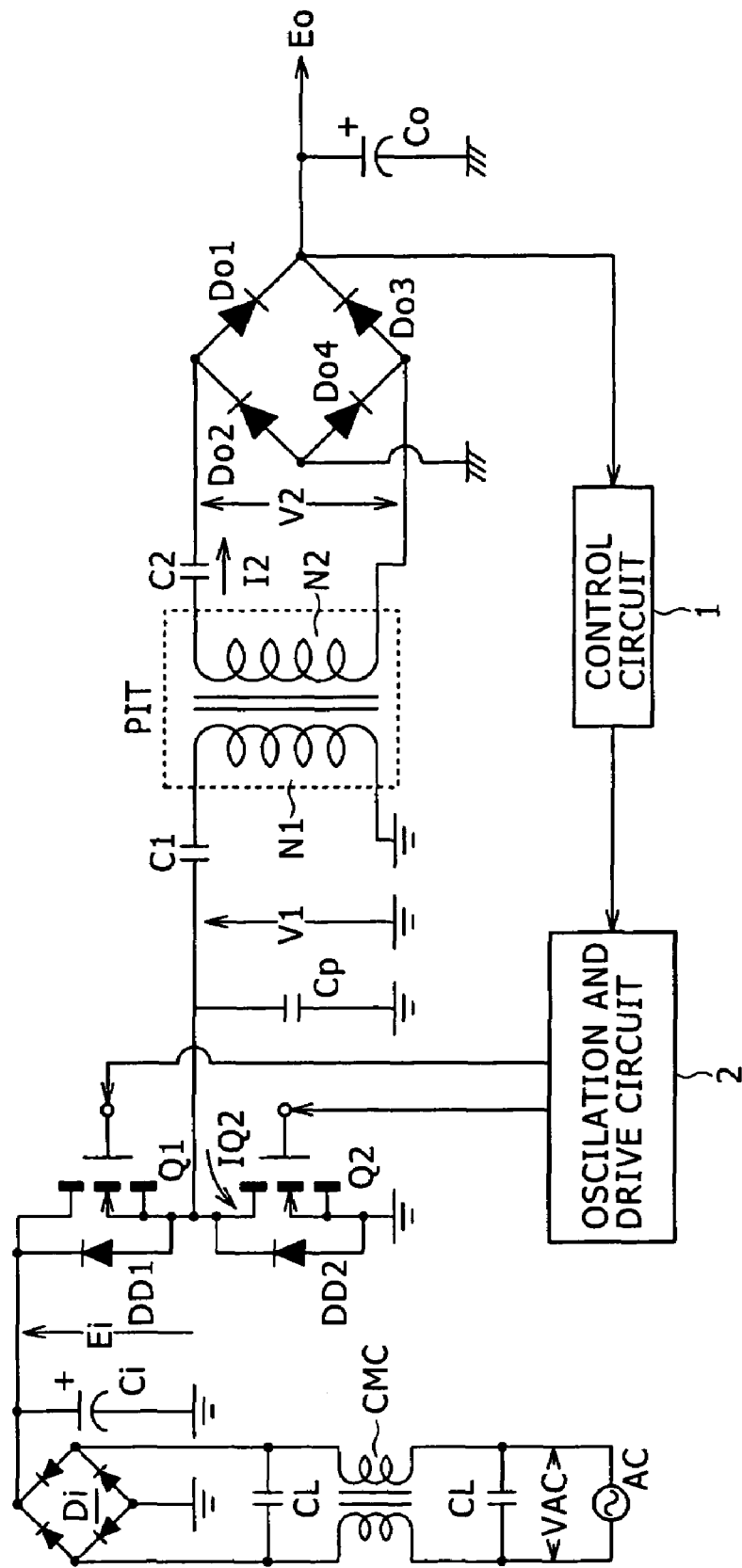
FIG. 1 is a circuit diagram illustrating the configuration of a switching power supply circuit according to a first embodiment of the present invention.

FIG. 1 is a circuit diagram illustrating a configuration example of a switching power supply circuit as a first embodiment of the invention.

The power supply circuit shown in the drawing employs as its basic configuration, a configuration in which a separately-excited current resonant converter constructed by half-bridge connection is combined with a partial voltage resonant circuit.

In the power supply circuit, coupled to the commercial alternating-current power supply AC is a common mode noise filter formed of the filter capacitors CL and the common mode choke coil CMC.

To the commercial power supply AC, a full-wave rectifying and smoothing circuit formed of the bridge rectifier circuit Di and the smoothing capacitor Ci are coupled downstream from the noise filter.

The full-wave rectifying and smoothing circuit is fed with an AC voltage from the commercial power supply AC and performs full-wave rectifying operation, and thus the rectified and smoothed voltage Ei (DC input voltage) is obtained across the smoothing capacitor Ci. The rectified and smoothed voltage Ei has the same level as that of the AC input voltage VAC.

As a current resonant converter that is fed with the DC input voltage and performs switching (intermittence), a switching circuit is provided in which two switching elements Q1 and Q2 formed of MOS-FETs are connected to each other by half-bridge connection as shown in the drawing. The damper diodes DD1 and DD2 are connected in parallel with the channel between the drain and source of the switching elements Q1 and Q2, respectively. The anode and cathode of the damper diode DD1 is connected to the source and drain of the switching element Q1, respectively. Similarly, the anode and cathode of the damper diode DD2 is connected to the source and drain of the switching element Q2, respectively. The damper diodes DD1 and DD2 are body diodes provided for the switching elements Q1 and Q2, respectively.

In addition, the primary-side partial resonant capacitor Cp is connected in parallel with the channel between the drain and source of the switching element Q2. At least the capacitance of the primary-side partial resonant capacitor Cp and the leakage inductance L1 of the primary winding N1 form a parallel resonant circuit (partial voltage resonant circuit). Thus, partial voltage resonant operation is achieved in which voltage resonance arises only when the switching elements Q1 and Q2 are turned off.

In addition, the oscillation and drive circuit 2 is provided for switching-driving the switching elements Q1 and Q2. The oscillation and drive circuit 2 includes an oscillation circuit and a drive circuit, and general-purpose ICs can be used therefor for example. The oscillation circuit in the oscillation and drive circuit 2 generates an oscillation signal with a requisite frequency. The drive circuit utilizes the oscillation signal to produce a switching drive signal that is a gate voltage for switching-driving the MOS-FETs, so that the switching drive signal is applied to the gates of the switching elements Q1 and Q2. Thus, in accordance with the switching frequency based on the cycle of the switching drive signal, the switching elements Q1 and Q2 implement switching operation so that they are consecutively turned on/off with alternate timings.

The isolation converter transformer PIT is provided in order to transmit switching outputs from the switching elements Q1 and Q2 to the secondary side.

One end of the primary winding N1 in the isolation converter transformer PIT is connected in series to the primary-side series resonant capacitor C1, and is coupled via the capacitor C1 to the connecting node (switching output node) between the source of the switching element Q1 and the drain of the switching element Q2, which allows transmission of the switching outputs. The other end of the primary winding N1 is connected to the primary-side ground.

Figure 2:
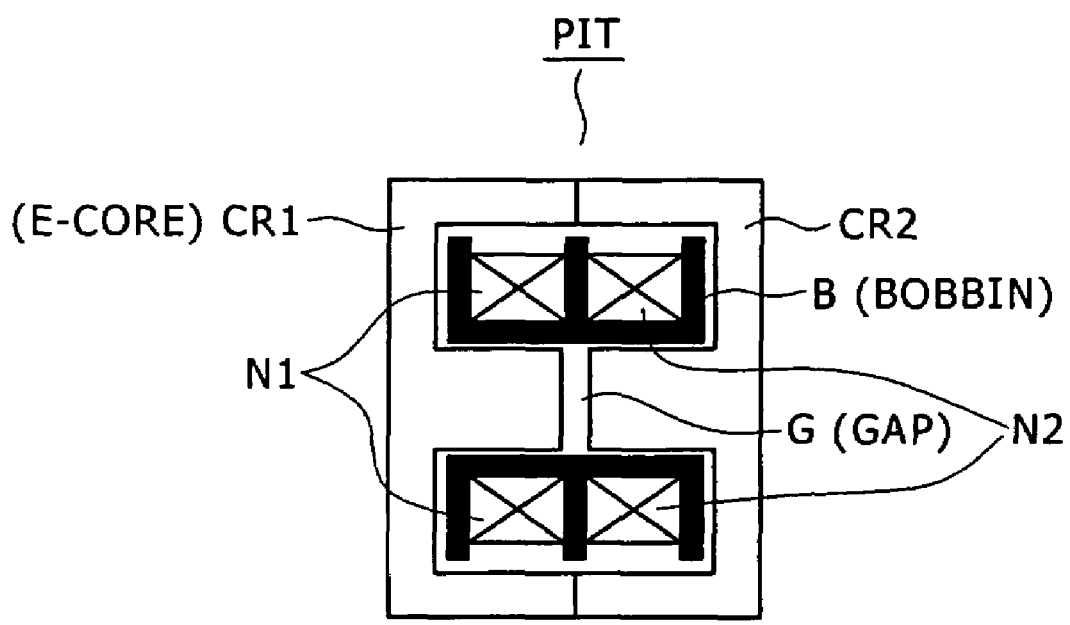
FIG. 2 is a sectional view illustrating a configuration example of an isolation converter transformer included in the switching power supply circuit of the embodiment.

The isolation converter transformer PIT has a structure like that shown in the sectional view of FIG. 2.

As shown in FIG. 2, the isolation converter transformer PIT includes an EE-core (EE-shaped core) formed by combining E-cores CR1 and CR2 made of a ferrite material in such a manner that their magnetic legs face each other.

Furthermore, a bobbin B is provided that is formed of resin or the like and has such a divided shape that winding parts on the primary side and secondary side are independent of each other. A primary-side winding (the primary winding N1) is wound around one winding part of the bobbin B. A secondary-side winding (the secondary winding N2) is wound around the other winding part. The bobbin B around which the primary-side and secondary-side windings have been thus wound is fitted to the EE-core (CR1, CR2), which results in the state in which the primary-side and secondary-side windings in the different winding regions are wound around the center leg of the EE-core. In this manner, the entire structure of the isolation converter transformer PIT is completed.

In the center leg of the EE-core, a gap G is formed as shown in the drawing. In this embodiment, the gap G is designed to have a gap length of about 2.0 mm for example, so that a loose coupling state between the primary side and secondary side is obtained in which the coupling coefficient k therebetween is about 0.80 or less. Note that the actual coupling coefficient K was 0.735 when the gap length was set to about 2.0 mm. The gap G can be formed by designing the center legs of the E-cores CR1 and CR2 to be shorter than two outer legs thereof.

Figure 12:
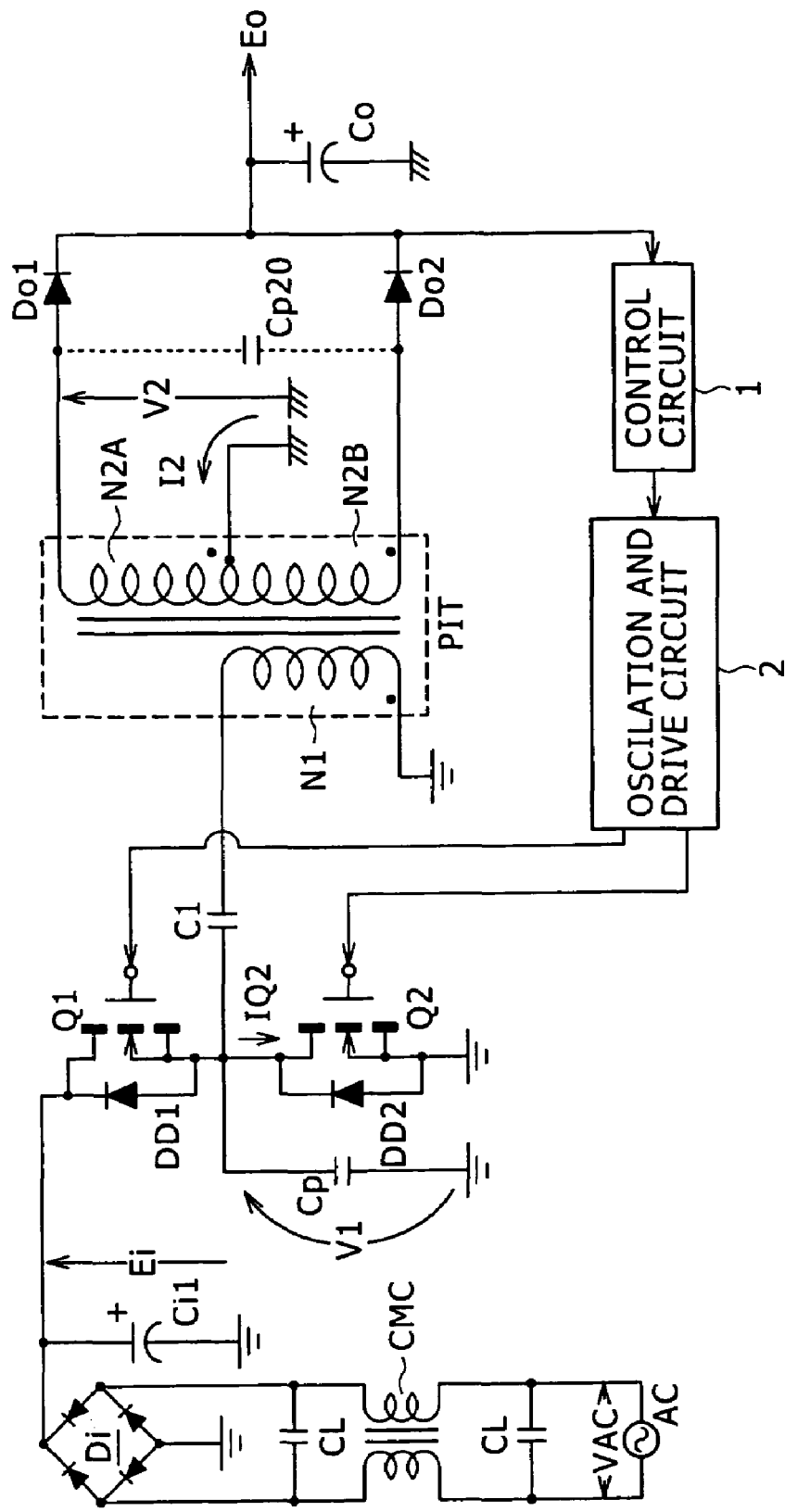
FIG. 12 is a circuit diagram illustrating a configuration example of a switching power supply circuit including a conventional complex resonant converter.
Figure 13:
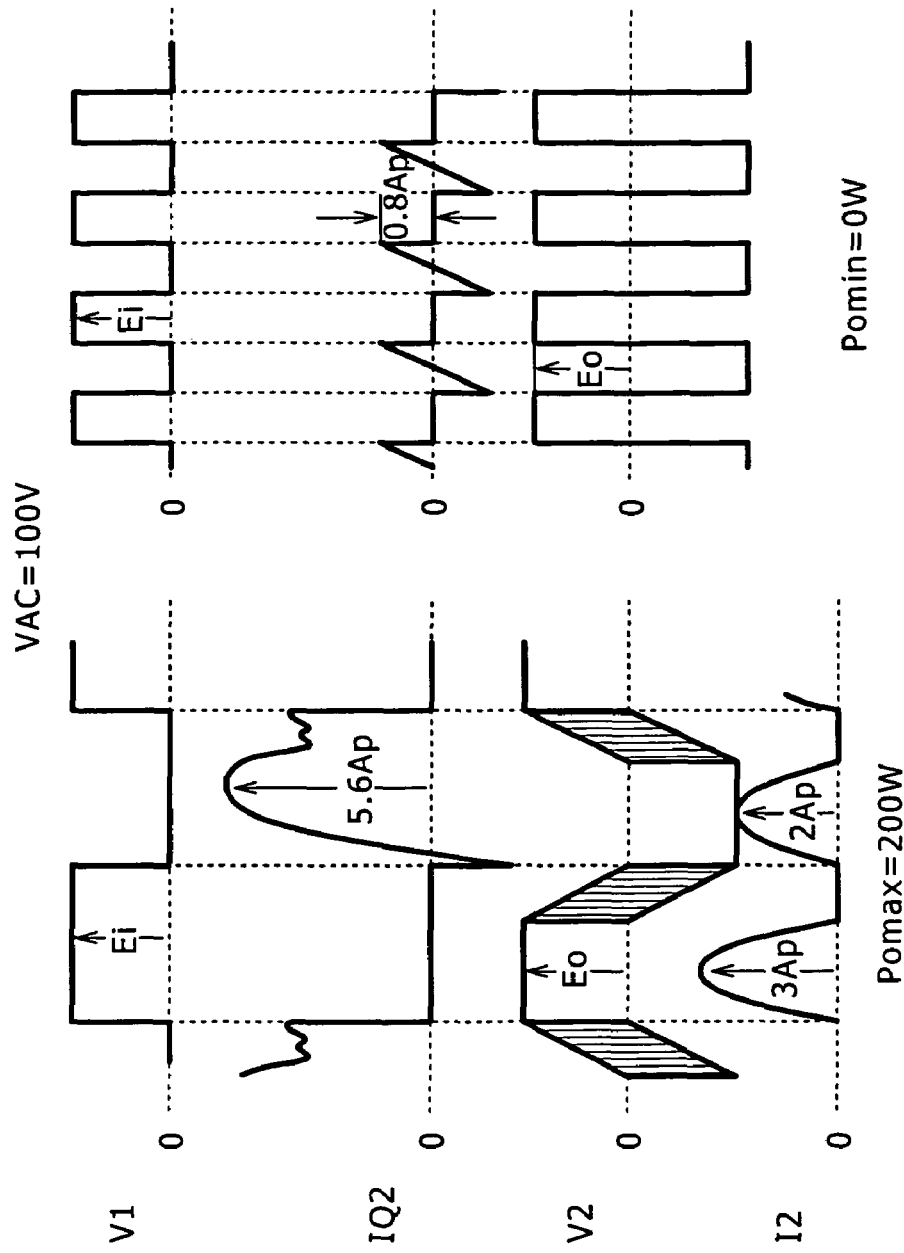
FIG. 13 is a waveform diagram showing the operation waveforms of major parts of the power supply circuit in FIG. 12.

In power supply circuits including a conventional current resonant converter, typified by the power supply circuit shown in FIG. 12, a gap of about 1.0 mm is formed in the core of the isolation converter transformer PIT as described above, to thereby achieve a coupling coefficient k of about 0.8 to 0.9.

That is, in the present embodiment, the coupling coefficient between the primary side and secondary side of the isolation converter transformer PIT is lower than that of a conventional configuration.

Referring back to FIG. 1, the isolation converter transformer PIT yields, due to its structure described referring to FIG. 2, a certain leakage inductance L1 in the primary winding N1. In addition, as described above, the primary winding N1 and the primary-side series resonant capacitor C1 are connected in series. Therefore, the leakage inductance L1 of the primary winding N1 and the capacitance of the primary-side series resonant capacitor C1 form a series resonant circuit (primary-side series resonant circuit).

The primary-side series resonant circuit is connected to the switching output node of the switching elements Q1 and Q2, and therefore switching outputs from the switching elements Q1 and Q2 are transmitted to the primary-side series resonant circuit. The primary-side series resonant circuit performs resonant operation with the transmitted switching output, which offers current resonant operation as the operation of the primary-side switching converter.

According to the above description, the primary-side switching converter shown in FIG. 1 offers current resonant operation by the primary-side series resonant circuit (L1-C1) and partial voltage resonant operation by the above-described primary-side partial voltage resonant circuit (Cp//L1).

That is, the primary side of the power supply circuit shown in the drawing employs a configuration in which a resonant circuit that offers a resonant converter as the primary-side switching converter is combined with another resonant circuit. In this specification, a switching converter formed of thus combined two resonant circuits is referred to also as a complex resonant converter.

In the secondary winding N2 of the isolation converter transformer PIT, an alternating voltage depending on the switching output transmitted to the primary winding N1 is excited (induced).

Provided for the secondary winding N2 is a full-wave bridge rectifier circuit that is formed of a bridge rectifier circuit including rectifier diodes Do1 to Do4 and the smoothing capacitor Co.

Furthermore, in the present embodiment, a secondary-side series resonant capacitor C2 is connected to the secondary winding N2 in series in the full-wave bridge rectifier circuit. Accordingly, due to the capacitance of the secondary-side series resonant capacitor C2 and a leakage inductance L2 of the secondary winding N2, a series resonant circuit is formed also on the secondary side of the isolation converter transformer PIT.

The specific configuration of the secondary side is as follows. One end of the secondary winding N2 is connected in series to the secondary-side series resonant capacitor C2, and is coupled via the capacitor C2 to the connecting node between the anode of the rectifier diode Do1 and the cathode of the rectifier diode Do2. The other end of the secondary winding N2 is coupled to the connecting node between the anode of the rectifier diode Do3 and the cathode of the rectifier diode Do4.

The connecting node between the anode of the rectifier diode Do2 and the anode of the rectifier diode Do4 is connected to the secondary-side ground. The connecting node between the cathode of the rectifier diode Do1 and the cathode of the rectifier diode Do3 is connected to the positive electrode of the smoothing capacitor Co. The negative electrode of the smoothing capacitor Co is connected to the secondary-side ground.

According to this connecting structure, in the periods of one half cycles of the alternating voltage arising in the secondary winding N2, the pair of the rectifier diodes Do1 and Do4 implement rectifying operation, to thereby charge the smoothing capacitor Co. In contrast, in the periods of the other half cycles of the alternating voltage arising in the secondary winding N2, rectifying operation by the pair of the rectifier diodes Do2 and Do3 charges the smoothing capacitor Co.

Due to the full-wave rectifying operation by these rectifier diodes Do1 to Do4, obtained across the smoothing capacitor Co is the secondary-side DC output voltage Eo depending on the level of the alternating voltage excited in the secondary winding N2. The secondary-side DC output voltage Eo is supplied to a load (not shown), and is branched and input to the control circuit 1 to be described later as a detected voltage.

In this configuration, the series resonant circuit formed on the secondary side offers current resonant operation as the secondary-side rectifying operation by the rectifier diodes Do1 to Do4.

The control circuit 1 supplies to the oscillation and drive circuit 2 a detection output depending on a level change of the secondary-side DC output voltage Eo. The oscillation and drive circuit 2 drives and controls the switching elements Q1 and Q2 so that the switching frequency is varied according to the detection output input from the control circuit 1. For this purpose, the oscillation and drive circuit 2 varies the frequency of an oscillation signal generated by the oscillation circuit therein.

Since the switching frequency of the switching elements Q1 and Q2 is varied, the resonant impedance of the primary-side series resonant circuit changes, and therefore the amount of power transmitted from the primary side to the secondary side of the isolation converter transformer PIT changes. Thus, operation for stabilizing the level of the secondary-side DC output voltage Eo is allowed.

In the switching frequency control method used by the power supply circuit of the present embodiment, a range of frequencies higher than the resonant frequency fo1 of the primary-side series resonant circuit is employed as the variable range of the switching frequency. That is, a so-called upper-side control method is employed.

In general, the resonant impedance of a series resonant circuit becomes lowest when the frequency is the resonant frequency. Therefore, if an upper-side control method based on the resonant frequency of a series resonant circuit is employed like the present embodiment, a higher switching frequency fs leads to a higher resonant impedance.

Accordingly, if there arises a tendency toward a heavier load and thus the secondary-side DC output voltage Eo decreases for example, control for lowering the switching frequency is carried out. The switching frequency lowering results in a decrease of the resonant impedance, which increases the amount of power transmitted from the primary side to the secondary side, and therefore raises the secondary-side DC output voltage Eo.

In contrast, when there arises a tendency toward a lighter load and thus the secondary-side DC output voltage Eo rises, control for increasing the switching frequency is carried out. Thus, the resonant impedance is increased and therefore the power transmission amount is decreased, which lowers the secondary-side DC output voltage Eo. In this manner, variation of the switching frequency allows stabilization of the secondary-side DC output voltage Eo.

The power supply circuit in FIG. 1 employs a wide-range compatible configuration that can operate compatibly both with the AC 100 V-system and with the AC 200 V-system.

In the power supply circuit in FIG. 1, as described above, a series resonant circuit is provided both on the primary side and secondary side, and the coupling coefficient k in the isolation converter transformer PIT is set lower than a conventional coefficient value.

Such a configuration offers a wide-range compatible circuit. This respect will be described below with reference to FIGS. 4 to 6.

Figure 4:
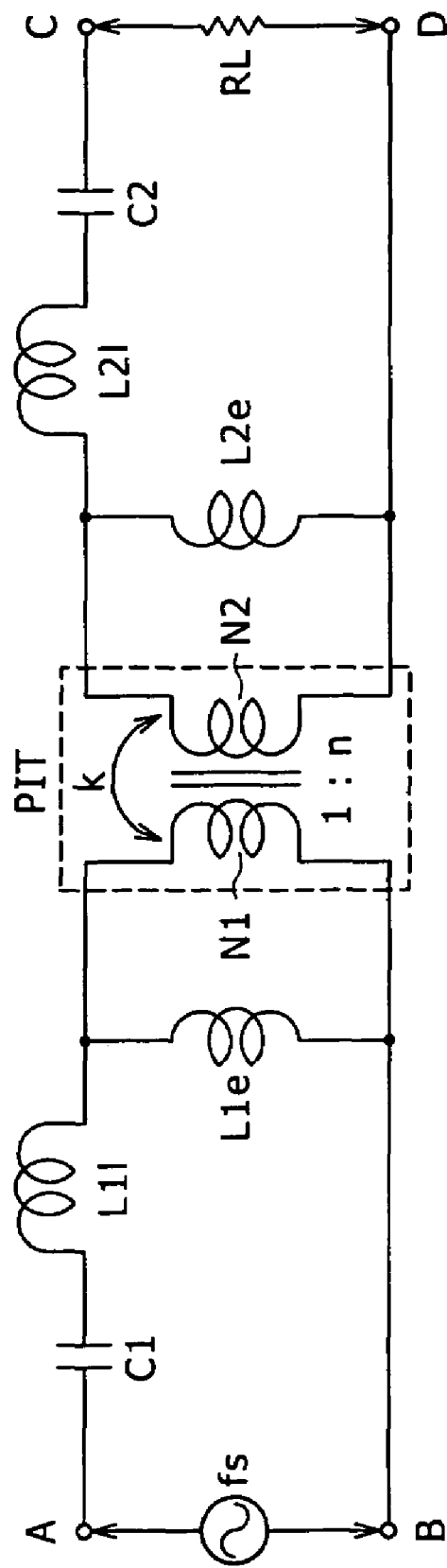
FIG. 4 is an equivalent circuit diagram representing the power supply circuit of the embodiment as an electro-magnetically coupled resonant circuit.

The circuit diagram of FIG. 4 shows an equivalent circuit of the power supply circuit of the present embodiment in FIG. 1 in terms of the relationship between the primary-side series resonant circuit and the secondary-side series resonant circuit. The same parts in the equivalent circuit diagram as those in FIG. 1 are given the same numerals.

FIG. 4 illustrates the isolation converter transformer PIT around which the primary winding N1 and the secondary winding N2 with a certain turns ratio of 1:n have been wound. In this drawing, the coupling degree between the primary side and secondary side in the isolation converter transformer PIT is expressed by the coupling coefficient k.

On the primary side of the isolation converter transformer PIT, L1*l* and L1*e* denote the leakage inductance and the magnetizing inductance of the primary winding N1, respectively. In addition, L2*l* and L2*e* on the secondary side of the isolation converter transformer PIT denote the leakage inductance and the magnetizing inductance of the secondary winding N2, respectively.

In the equivalent circuit diagram of FIG. 4, an AC voltage (frequency signal) with the switching frequency fs is input to the primary side of the isolation converter transformer PIT. That is, this input voltage is the switching output from the primary-side switching converter (the switching elements Q1 and Q2).

On the primary side of the isolation converter transformer PIT, the input AC voltage having the switching frequency fs is supplied to the primary-side series resonant circuit. As shown in the drawing, this primary-side series resonant circuit can be regarded as a circuit in which the primary-side series resonant capacitor C1 and the leakage inductance L1*l* are connected in series to the primary winding N1, and the magnetizing inductance L1*e* is connected in parallel with the primary winding N1.

Similarly, the secondary-side series resonant circuit of the isolation converter transformer PIT can be regarded as a circuit in which the secondary-side series resonant capacitor C2 and the leakage inductance L2*l* are connected in series to the secondary winding N2, and the magnetizing inductance L2*e* is connected in parallel with the secondary winding N2. In addition, in this drawing, the output from the secondary-side series resonant circuit having the above configuration is supplied to a load RL. The load RL corresponds to a circuit and a load subsequent to the secondary-side full-wave rectifier circuit.

In the equivalent circuit of FIG. 4 having the above-described connecting configuration, the leakage inductance L1*l* of the primary winding N1 can be expressed by Formula 1, where k is the coupling coefficient of the isolation converter transformer PIT and L1 is the self inductance of the primary winding N1.

$$L1l=(1-k^2)L1 \qquad \text{Formula 1}$$

The magnetizing inductance L1*e* of the primary winding N1 can be expressed by Formula 2.

$$L1e=k^2 \times L1 \qquad \text{Formula 2}$$

Similarly, the leakage inductance L2*l* and the magnetizing inductance L2*e* of the secondary winding N2 can be expressed by Formulas 3 and 4, respectively, where L2 is the self inductance of the secondary winding N2.

$$L2l=(1-k^2)L2 \qquad \text{Formula 3}$$

$$L2e=k2 \times L2 \qquad \text{Formula 4}$$

The equivalent circuit in FIG. 4 includes the primary-side series resonant circuit on the primary side and the secondary-side series resonant circuit on the secondary side, with the intermediary of electromagnetic induction by the isolation converter transformer PIT therebetween. Accordingly, the circuit of this drawing can be regarded as a coupled resonant circuit employing electromagnetic coupling. Therefore, the constant-voltage control characteristic of the power supply circuit in FIG. 1 in regard to the secondary-side DC output voltage Eo differs depending on the coupling degree (the coupling coefficient k) of the isolation converter transformer PIT. This respect will be described below with reference to FIG. 5.

Figure 5:
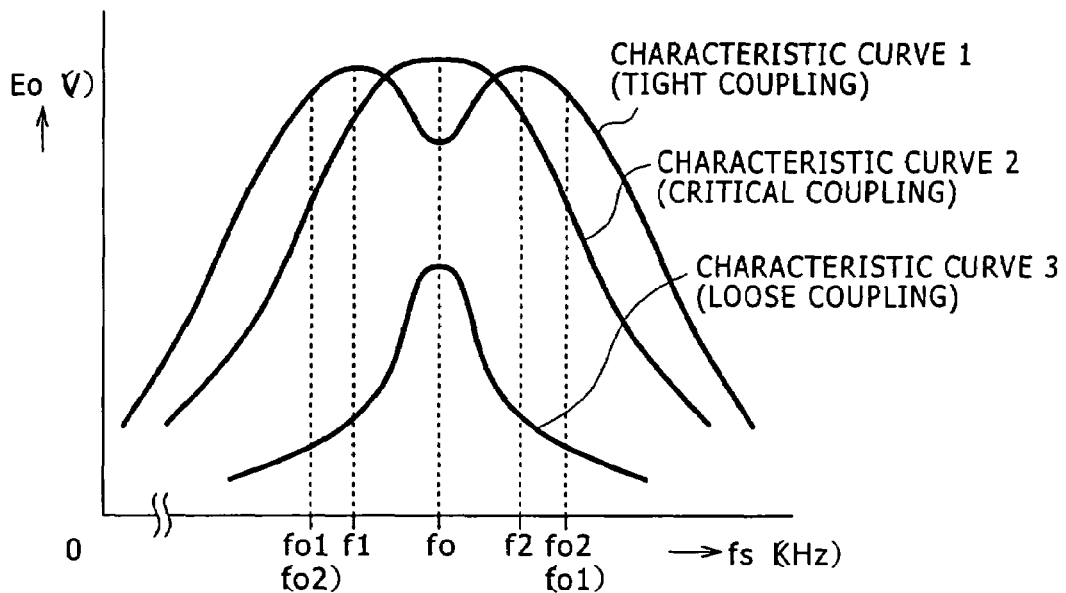
FIG. 5 is a diagram illustrating the constant-voltage control characteristic of the power supply circuit of the embodiment.

FIG. 5 shows the output characteristic of the equivalent circuit of FIG. 4 with respect to the input (switching frequency signal) thereto. Specifically, the characteristic of controlling the secondary-side DC output voltage Eo is indicated as the relationship between the voltage Eo and the switching frequency fs.

In FIG. 5, switching frequencies are plotted on the abscissa while the levels of the secondary-side DC output voltage Eo are plotted on the ordinate.

On the abscissa, the resonant frequency fo1 of the primary-side series resonant circuit and the resonant frequency fo2 of the secondary-side series resonant circuit overlap with each other, which means that similar characteristics are obtained irrespective of the set values of the resonant frequencies fo1 and fo2.

When the isolation converter transformer PIT employs tight coupling in which the coupling coefficient k is 1, the leakage inductance L1*l* of the primary winding N1 and the leakage inductance L2*l* of the secondary winding N2 are expressed by Formula 5 since k in Formulas 1 and 3 is replaced by 1.

$$L1l=L2l=0 \qquad \text{Formula 5}$$

That is, when the isolation converter transformer PIT employs tight coupling, no leakage inductance exists in the primary winding N1 and the secondary winding N2.

When the primary side and secondary side of the isolation converter transformer PIT are thus tightly coupled, the constant-voltage control characteristic draws a so-called bimodal curve as shown by Characteristic curve 1 in FIG. 5. In this curve, the secondary-side DC output voltage Eo comes to peaks when the switching frequency is at frequency values of f1 and f2 that are different from the resonant frequencies fo1 and fo2 of the primary-side and secondary-side series resonant circuits, respectively.

The frequency f1 is expressed by Equation 1.

$$f1=fo/\sqrt{1+k} \qquad \text{Equation 1}$$

The frequency f2 is expressed by Equation 2.

$$f2=fo/\sqrt{1-k} \qquad \text{Equation 2}$$

In Equations 1 and 2, fo, which is one of the terms, denotes the center resonant frequency that exists at the center between the resonant frequency fo1 of the primary-side series resonant circuit and the resonant frequency fo2 of the secondary-side series resonant circuit. The center resonant frequency is determined depending on the impedance of the primary side, the impedance of the secondary side, and the impedance common to the primary and secondary sides (mutual coupling inductance M).

The mutual coupling inductance M is expressed by Equation 3.

$$M=k\sqrt{L1 \times L2} \qquad \text{Equation 3}$$

If the coupling coefficient k is gradually decreased from 1, e.g., if the coupling state is gradually shifted from tight coupling toward loose coupling, such a change arises in Characteristic curve 1 in FIG. 5 that the bimodal tendency gradually fades and a curve near the center resonant frequency fo becomes flat. Subsequently, when the coupling coefficient k is decreased to a certain value, the coupling state reaches a so-called critical coupling state. In the critical coupling state, as shown by Characteristic curve 2, the bimodal characteristic tendency has disappeared and the shape of a curve around the center resonant frequency fo is flat.

If the coupling coefficient k is further decreased from the critical coupling state, and thus the loose coupling state is further advanced, a unimodal characteristic is obtained as shown by Characteristic curve 3 of FIG. 5, in which one peak exists only at the center frequency fo. A comparison of Characteristic curve 3 with Characteristic curves 1 and 2 makes it apparent that Characteristic curve 3 has a steeper slope than that of Characteristic curves 1 and 2 as its quadratic curve shape, although the peak level itself of Characteristic curve 3 is lower than that of Characteristic curves 1 and 2.

The isolation converter transformer PIT of the present embodiment employs a loose coupling state in which the coupling coefficient k is smaller than about 0.8. Such a coupling coefficient k provides operation based on a unimodal characteristic shown by Characteristic curve 3.

Figure 14:
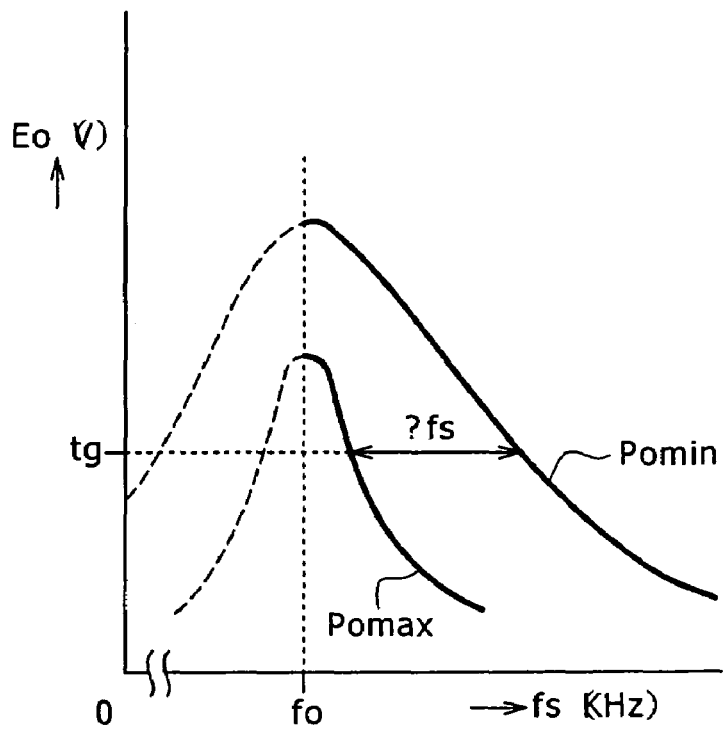
FIG. 14 is a diagram showing a constant-voltage control characteristic when the coupling coefficient between a primary side and a secondary side is designed to a conventional value.
Figure 15:
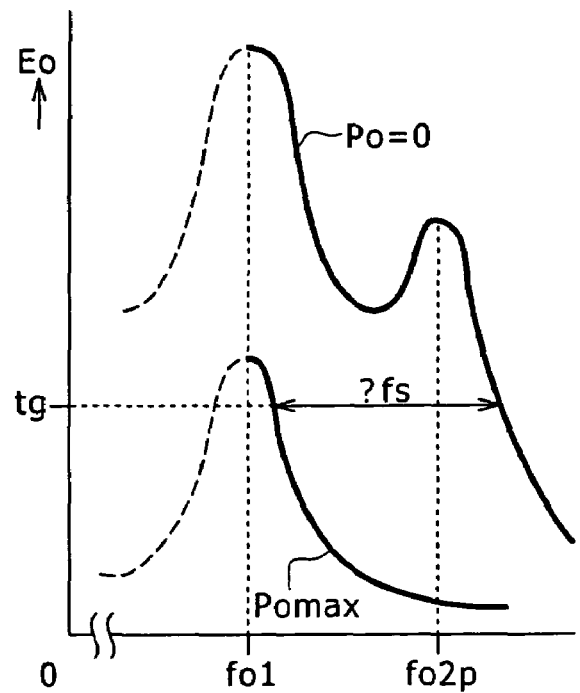
FIG. 15 is a diagram illustrating the constant-voltage control characteristic of the circuit in FIG. 12 including a full-wave center-tap rectifier circuit as its secondary-side rectifier circuit.
Figure 16:
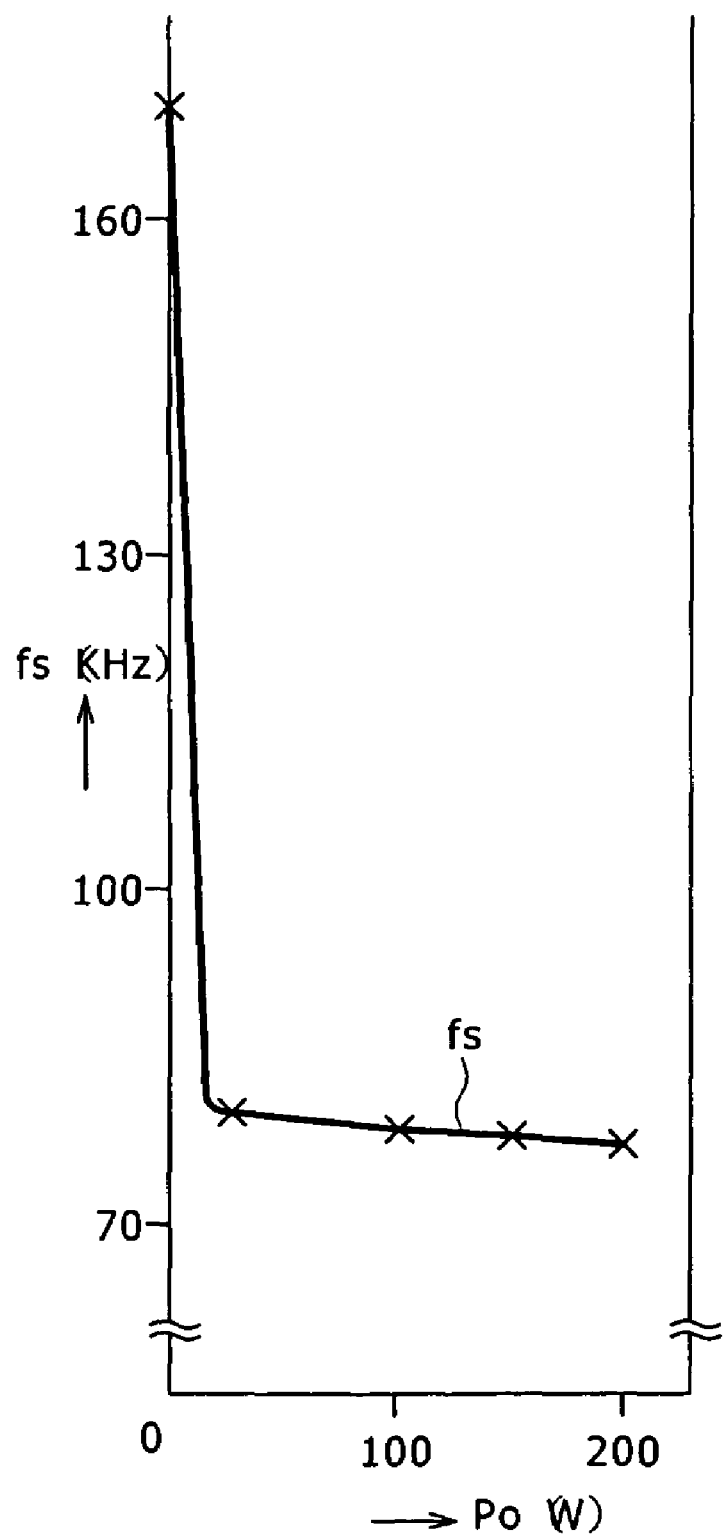
FIG. 16 is a characteristic diagram showing the switching frequency characteristic of the circuit in FIG. 12 as a function of load.

When the unimodal characteristic shown in FIG. 5 is compared with the constant-voltage control characteristic in FIG. 14 of a conventional complex resonant converter, it is apparent that the characteristic in FIG. 14 shows a considerably gentler slope as a quadratic curve than that of FIG. 5.

Since the characteristic of a conventional power supply circuit shows a gentle curve as shown in FIG. 14, even when the circuit has a single-range compatible configuration for example, the requisite control range of the switching frequency fs for constant-voltage control of the secondary-side DC output voltage Eo is from about 80 kHz to about 200 kHz, and therefore Δfs is about 100 kHz or larger.

Accordingly, as described above, it is very difficult to provide a power supply circuit with a wide-range compatible characteristic only by implementing constant-voltage control by switching frequency control.

Figure 6:
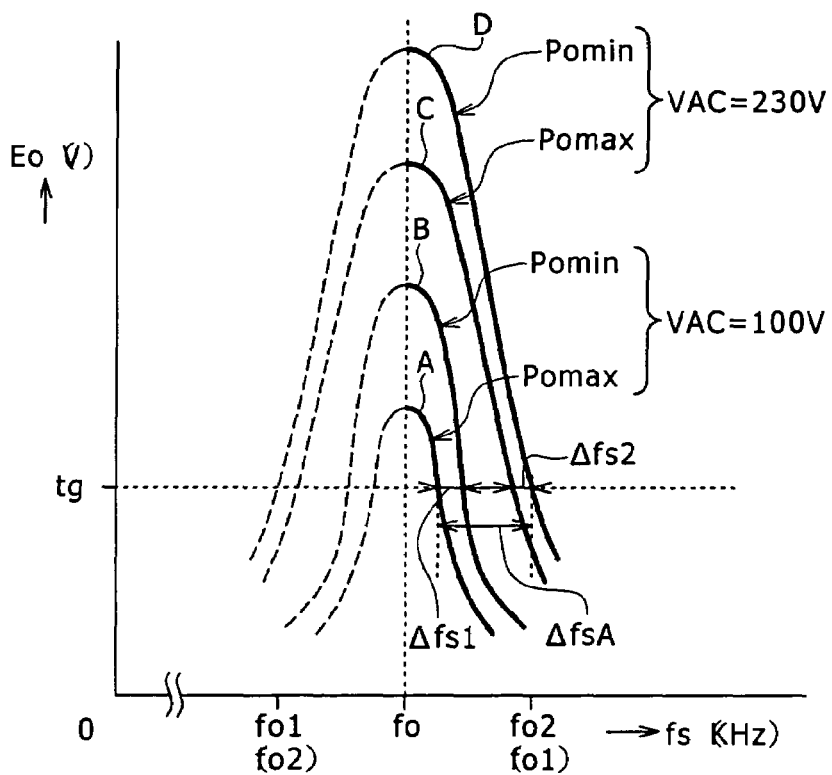
FIG. 6 is a diagram illustrating, as the constant-voltage control operation of the power supply circuit of the embodiment, the switching frequency control range (requisite control range) for addressing AC input voltage variation and load variation.

In contrast, the constant-voltage control characteristic of the present embodiment is a unimodal characteristic shown by Characteristic curve 3 in FIG. 5, and therefore the constant-voltage control operation thereof is expressed by the characteristic curves of FIG. 6.

FIG. 6 illustrates four Characteristic curves A to D obtained from the power supply circuit in FIG. 1 according to the present embodiment. Characteristics curves A and B correspond to the maximum load power Pomax and the minimum load power Pomin, respectively, when the AC input voltage VAC is 100V (AC 100 V-system). Characteristics curves C and D correspond to the maximum load power Pomax and the minimum load power Pomin, respectively, when the AC input voltage VAC is 230V (AC 200 V-system).

As is apparent from FIG. 6, when the AC input voltage VAC is 100 V, which corresponds to an AC 100 V-system input, the variable control range (requisite control range) of the switching frequency required for keeping the secondary-side DC output voltage Eo constant at a requisite level tg, is expressed by Δfs1. Specifically, the requisite control range is the frequency range from the switching frequency fs providing the level tg on Characteristic curve A to the switching frequency fs providing the level tg on Characteristic current B.

In addition, when the AC input voltage VAC is 230V, which corresponds to an AC 200 V-system input, the variable control range (requisite control range) of the switching frequency required for keeping the secondary-side DC output voltage Eo constant at the requisite level tg, is expressed by Δfs2. Specifically, the requisite control range is the frequency range from the switching frequency fs providing the level tg on Characteristic curve C to the switching frequency fs providing the level tg on Characteristic current D.

As described above, the unimodal characteristic as the characteristic of controlling the secondary-side DC output voltage Eo in the present embodiment draws a considerably steep quadratic curve compared with the control characteristic shown in FIG. 14.

Therefore, the requisite control ranges Δfs1 and Δfs2 obtained when the AC input voltage VAC is 100 V and 230 V, respectively, are considerably smaller than the range Δfs in FIG. 14. For example, actually measured ranges Δfs1 and Δfs2 were found to be smaller than an actual range Δfs in FIG. 14 by a factor of about one-tenth.

In addition, the frequency variable range (ΔfsA) between the minimum switching frequency in the range Δfs1 (the switching frequency fs providing the level tg on Characteristic curve A) and the maximum switching frequency in the range Δfs2 (the switching frequency fs providing the level tg on Characteristic curve D), is also considerably small.

An actual frequency variable range ΔfsA in the power supply circuit of the present embodiment in FIG. 1 sufficiently falls within a switching frequency variable range of a present switching drive IC (the oscillation and drive circuit 2). That is, the power supply circuit in FIG. 1 can variably control its switching frequency within the frequency variable range ΔfsA actually. This fact means that the power supply circuit in FIG. 1 can stabilize the secondary-side DC output voltage Eo both for a commercial AC voltage input of the AC 100 V-system and for that of the AC 200 V-system. That is, the power supply circuit in FIG. 1 is allowed to have a wide-range compatible configuration only by switching frequency control.

Note that coupled resonant circuits employing electromagnetic coupling have been already known as a unit for, in communication techniques, widening the amplification bandwidth of an amplification circuit formed of a transistor. The unit is typified by intermediate frequency transformer amplifiers for example. In this technique field, however, a unimodal characteristic due to loose coupling is not used but a bimodal characteristic due to tight coupling or a flat characteristic due to critical coupling is used. In the present embodiment, regarding a technique of such a coupled resonant circuit employing electromagnetic coupling, a unimodal characteristic due to loose coupling, which has been not used in communication technique fields, is actively used in a field of a resonant switching converter. Thus, the switching frequency variable range (requisite control range) required for stabilizing the secondary-side DC output voltage Eo is narrowed as described above, which allows a wide-range compatible configuration only by constant-voltage control by switching frequency control.

Typically, when the degree of loose coupling is increased between the primary side and secondary side of the isolation converter transformer PIT, there arises a tendency that the power loss in the isolation converter transformer PIT is increased and therefore the power conversion efficiency is correspondingly lowered. However, the present embodiment can achieve power conversion efficiency sufficient for practical use as described later. This is due to a characteristic that a series resonant circuit (secondary-side series resonant circuit) is formed also on the secondary-side.

Specifically, the provision of a secondary-side series resonant circuit increases energy due to its resonant operation, and power including the increased energy can be supplied as the secondary-side DC output voltage Eo. Therefore, the efficiency decrease due to loose coupling is compensated.

It should be noted, for reconfirmation, that when the secondary-side series resonant capacitor C2 is provided to form a series resonant circuit also on the secondary side like the present embodiment, a winding current needs to flow through the entire secondary winding N2 in each half cycle period in order to offer resonant operation as the secondary-side rectifying operation. Therefore, it is essential that the rectifier circuit on the secondary side have a circuit configuration other than a half-wave rectifier circuit and a full-wave center-tap rectifier circuit. Accordingly, the power supply circuit in FIG. 1 includes a full-wave bridge rectifier circuit as its secondary-side rectifier circuit.

For such circumstances, when it is aimed to employ a wide-range compatible configuration of the embodiment, a conventional full-wave center-tap rectifier circuit like that shown in FIG. 12 is not used as a secondary-side rectifier circuit. Therefore, there is no possibility that use of a full-wave center-tap rectifier precludes the realization of a wide-range compatible configuration employing switching frequency control.

Figure 3A:
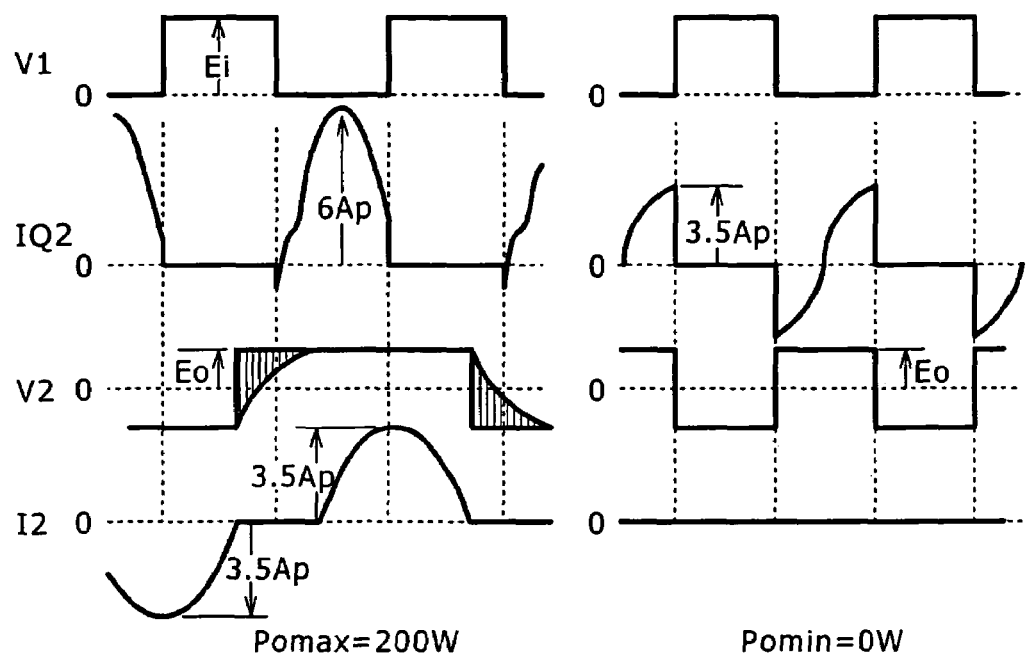
FIGS. 3A and 3B are waveform diagrams illustrating the operation waveforms of major parts in the power supply circuit of the embodiment.
Figure 3B:
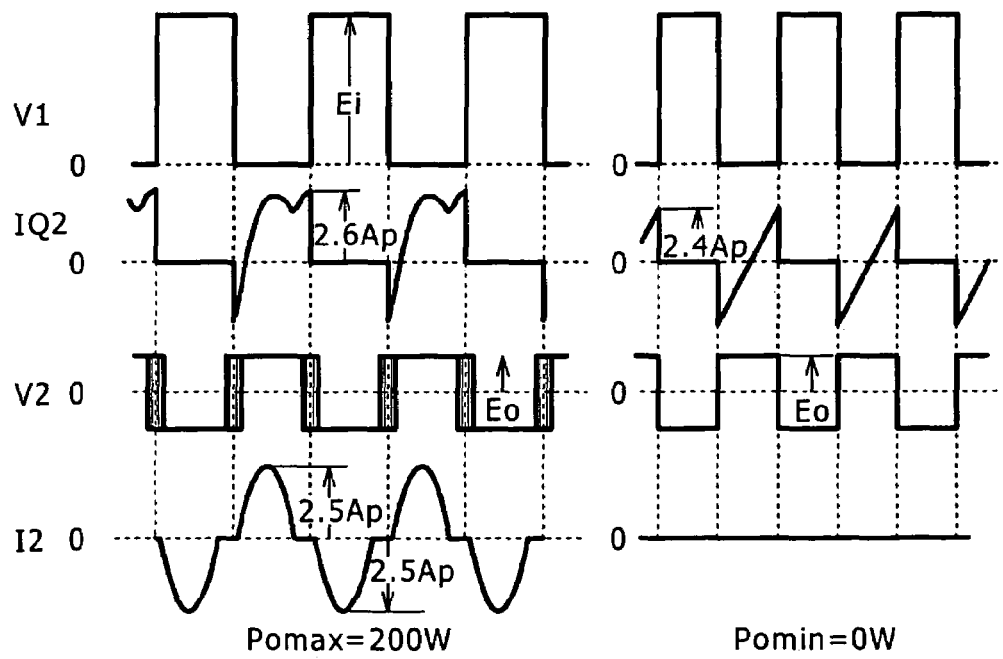

FIGS. 3A and 3B are waveform diagrams for showing the operations of major parts in the power supply circuit of FIG. 1.

FIG. 3A shows operation waveforms when the AC input voltage VAC is 100 V. FIG. 3B shows operation waveforms when the AC input voltage VAC is 230 V. Furthermore, both in FIGS. 3A and 3B, the left and right diagrams show operation waveforms when the load power Po is 200 W and 0 W, respectively.

The load powers Po of 200 W and 0 W correspond to the maximum load power (Pomax) and the minimum load power (Pomin), respectively, in the power supply circuit of the embodiment.

The experiment results in FIG. 3 were obtained when elements having the following characteristics are selected as the major parts in the circuit of FIG. 1:

The isolation converter transformer PIT having a gap G with a gap length of 2.0 mm and a coupling coefficient k of about 0.735; the primary winding N1 of which number of turns is 30 T; the secondary winding N2 of which number of turns of is 26 T The primary-side series resonant capacitor C1 having a capacitance of 0.039 µF The secondary-side series resonant capacitor C2 having a capacitance of 0.027 µF.

By thus setting the numbers of turns of the primary and secondary windings N1 and N2, and the capacitances of the primary-side and secondary-side series resonant capacitors C1 and C2, the resonant frequency fo1 of the primary-side series resonant circuit and the resonant frequency fo2 of the secondary-side series resonant circuit were set to about 60 kHz and about 84 kHz, respectively.

In addition, by selecting each element as described above, the induction voltage level per one turn of the secondary winding N2 was set to 5 V/T.

Referring to FIG. 3, the rectangular waveform voltage V1 is a voltage across the switching element Q2, and indicates the on/off timings of the switching element Q2. The voltage V1 has a waveform in which the voltage level is at the 0 level in the on-period during which the switching element Q2 is in the on-state, and the voltage level is clamped at the level of the rectified and smoothed voltage Ei in the off-period during which the switching element Q2 is in the off-state.

During the on-period of the switching element Q2, the switching current IQ2 having the illustrated waveform flows through the switching circuit system composed of the switching element Q2 and the clamp diode DD2. In contrast, the switching current IQ2 is at the 0 level during the off-period of the switching element Q2.

In addition, although not illustrated, a voltage across the other switching element Q1 and a switching current flowing through the other switching circuit system (Q1, DD1) have a waveform obtained by shifting by 180° the phase of the waveform of the voltage V1 and the switching current IQ2, respectively. That is, the switching elements Q1 and Q2 implement switching operation with the same cycle so that they are alternately turned on/off.

A primary-side series resonant current Io (not shown) flows through the primary-side series resonant circuit (L1-C1) as a current component resulting from synthesis of the switching currents flowing through these switching circuits (Q1, DD1) and (Q2, DD2).

Referring to FIG. 3A, when the AC input voltage VAC is 100 V, the peak levels of the switching current IQ2 when the load power is the maximum load power Pomax of 200 W and the minimum load power Pomin of 0 W are about 6.0 Ap and about 3.5 Ap, respectively.

Referring to FIG. 3B, when the AC input voltage VAC is 230 V, the peak levels of the switching current IQ2 when the load power is the maximum load power Pomax of 200 W and the minimum load power Pomin of 0 W are about 2.6 Ap and about 2.4 Ap, respectively.

The operation on the primary side, indicated by the above-described voltage V1 and the switching current IQ2, induces an alternating voltage V2 having the illustrated waveform in the secondary winding N2 of the isolation converter transformer PIT. The alternating voltage V2 has a waveform in which the voltage level is clamped at the level of the secondary-side DC output voltage Eo.

Since the alternating voltage V2 with this waveform is obtained, the secondary-side bridge rectifier circuit performs such operation that in the periods of the half cycles during which the alternating voltage V2 is positive, the pair of the rectifier diodes Do1 and Do4 become conductive to charge a rectified current in the smoothing capacitor Co. In contrast, in the periods of the half cycles during which the alternating voltage V2 is negative, the pair of the rectifier diodes Do2 and Do3 become conductive to charge a rectified current in the smoothing capacitor Co.

Due to such operation, the secondary-side rectified current I2 flowing through the secondary-side rectified current path has a waveform in which the current level is positive in the period during which the alternating voltage V2 comes to the positive peak level, while it is negative in the period during which the alternating voltage V2 comes to the negative peak level (see the respective diagrams for the maximum load power Pomax). In contrast, when the load power is the minimum load power Pomin of 0 W, the secondary-side rectified current I2 is at the 0 level.

A comparison between FIGS. 3A and 3B clearly indicates the following fact. Specifically, in the waveform diagram of FIG. 3B corresponding to the AC input voltage VAC of 230 V and the load power of 200 W, the conduction periods of the secondary-side rectified current I2 fall within the conduction periods of the primary-side switching current IQ2, and the phases of these waveforms are identical to each other. In contrast, in the waveform diagram of FIG. 3A corresponding to the AC input voltage VAC of 100 V and the load power of 200 W, the conduction periods of the secondary-side rectified current I2 do not fall within the conduction periods of the switching current IQ2, and a requisite shift arises between the phases of these waveforms.

This is because, in the present embodiment, the resonant frequencies fo1 and fo2 of the resonant circuits on the primary and secondary sides have been set so that fo2 nearly equals fo1×1.4 by setting the constant of each element as described above.

In the present embodiment, the following experiment result was obtained. Specifically, the peak levels of the switching current IQ2 when the AC input voltage VAC was 230 V were suppressed by ensuring, by use of the above-described setting of the resonant frequencies fo1 and fo2, a requisite shift between the phases of the switching current IQ2 and the secondary-side rectified current I2 at least when the AC input voltage VAC was 100 V and the load power was the maximum power load Pomax of 200 W.

The fact that the peak levels of the switching current IQ2 when the AC input voltage VAC is 230 V are suppressed is apparent also from the fact that the ratio between the peak levels of the switching current IQ2 when the load power is 200 W and when it is 0 W in FIG. 3B is smaller than that in FIG. 3A.

Since the peak level of the switching current IQ2 is thus suppressed, the peak level of the primary-side series resonant current (Io) flowing through the primary-side series resonant circuit is also suppressed. In addition, the suppression of peak level of the primary-side series resonant current is equivalent to suppression of the level of currents flowing through the switching elements Q1 and Q2. Therefore, switching losses in the switching elements Q1 and Q2 are lowered.

Thus, in the power supply circuit of FIG. 1, power loss is decreased when the AC input voltage VAC is 230 V and the load power is the maximum load power Pomax of 200 W in particular, and correspondingly power conversion efficiency when a large AC input voltage (AC 200 V-system) is used is enhanced.

When, by use of the above-described setting of the resonant frequencies fo1 and fo2, a requisite shift is ensured between the phases of the switching current IQ2 and the secondary-side rectified current I2 at least when the AC input voltage VAC is 100 V and the load power is 200 W, the peak waveform of the switching current IQ2 (primary-side series resonant current) when the AC input voltage VAC is 100 V and the load power is 200 V is a substantially sinusoidal waveform, while that when the AC input voltage VAC is 230 V and the load power is 200 V is a substantially M-shaped waveform, as shown in FIGS. 3A and 3B.

Although the present embodiment designs the resonant frequencies fo1 and fo2 so that fo2 nearly equals fo1×1.4, the relationship between the resonant frequencies fo1 and fo2 that should be set for achieving the above-described advantage is not limited thereto. The relationship may adequately be changed depending on the corresponding load condition and so on in practice.

Specifically, in terms of achieving an advantage of enhancing power conversion efficiency when a large AC input voltage is used as described above, any values of the resonant frequencies fo1 and fo2 are available as long as a requisite shift is ensured between the phases of the primary-side series resonant current and the secondary-side rectified current at least when the AC input voltage VAC is 100 V and the load power is the maximum load power Pomax of 200 W.

As is apparent from the waveforms of the secondary-side rectified current I2 shown in FIGS. 3A and 3B, the rectified current flowing through the secondary side of the circuit in FIG. 1 has the positive and negative peak levels of which absolute values are identical to each other. Specifically, the absolute values of the positive and negative peak levels are identically 3.5 Ap when the AC input voltage VAC is 100 V and the load power is the maximum load power Pomax as shown in FIG. 3A. Furthermore, the absolute values of the positive and negative peak levels are both 2.5 Ap when the AC input voltage VAC is 230 V and the load power is the maximum load power Pomax.

The same absolute values of the positive and negative peak levels of the secondary-side rectified current are due to the configuration of the circuit of FIG. 1, in which a bridge rectifier circuit is provided as the secondary-side rectifier circuit and the secondary-side series resonant capacitor C2 is provided.

Specifically, in the circuit of FIG. 1, bias magnetization does not arise in the secondary winding N2 of the isolation converter transformer PIT unlike the power supply circuit of FIG. 12 including a full-wave center-tap rectifier circuit. Therefore, a situation is avoided in which bias magnetization causes a difference between the peak levels of the rectified current in the respective half cycles of an alternating voltage excited in the secondary winding N2.

Thus, the peak levels of a rectified current flowing through the rectifier diodes on the secondary side are not different from each other, which allows selection of parts having the same breakdown current level. As a result, the circuit fabrication costs can be correspondingly reduced.

In addition, since the secondary-side rectified current thus has the same peak level in the respective half cycles, a problem of bias of conduction losses in the rectifier diodes Do is also eliminated.

Figure 7:
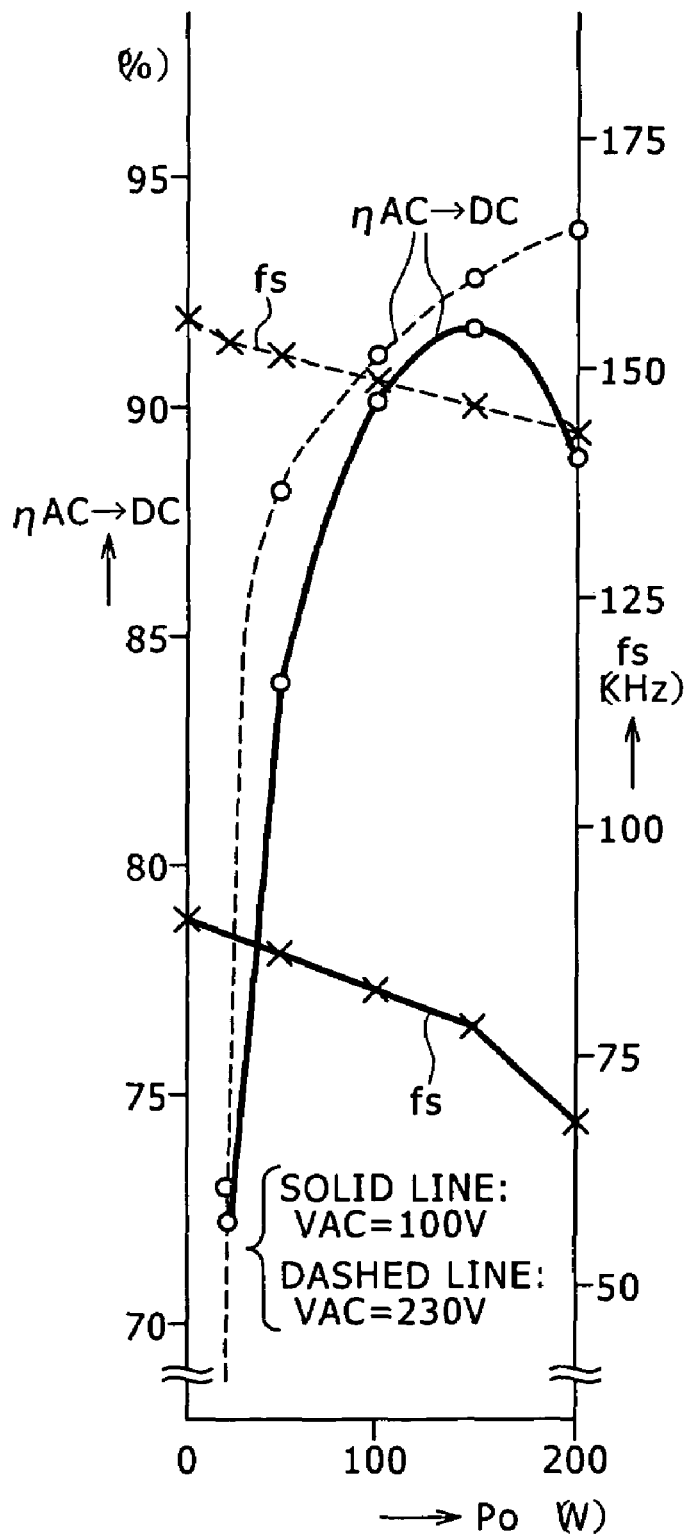
FIG. 7 is a diagram showing the AC to DC power conversion efficiency and switching frequency characteristic of the power supply circuit of the embodiment as a function of load.

FIG. 7 shows, as actual experiment results on the power supply circuit in FIG. 1, the AC to DC power conversion efficiency ηAC→DC and switching frequency characteristic as a function of load.

In FIG. 7, the solid line and dashed line indicate the characteristics when the AC input voltage VAC is 100 V and those when it is 230 V, respectively.

The AC to DC power conversion efficiency has a tendency of rising up as a load becomes heavier as shown in the drawing. According to the experiments, when the load power Po was the maximum load power (200 W), the AC to DC power conversion efficiency ηAC→DC when the AC input voltage VAC was 100 V and when it was 230 V were found to be about 89.4% and about 94.2%, respectively.

The present assignee has proposed, as a power supply circuit including a series resonant circuit both on the primary and secondary sides like the circuit shown in FIG. 1, a power supply circuit in which the coupling coefficient k of the isolation converter transformer PIT is set to about 0.7 or lower. However, the power supply circuit does not employ such setting of the resonant frequency fo1 of the primary-side series resonant circuit and the resonant frequency fo2 of the secondary-side series resonant circuit that a phase shift arises between the primary-side series resonant current and secondary-side rectified current as described above, unlike the power supply circuit of the embodiment. When the configuration of the power supply circuit proposed in advance was adopted, the power conversion efficiency ηAC→DC for the maximum load power was found be about 89.0% both when the AC input voltage VAC is 100 V and when it is 230 V.

In contrast, according to the above-described experiment results on the power supply circuit of the present embodiment, the power conversion efficiency ηAC→DC when the AC input voltage VAC was 100 V and when it was 230 V were about 89.4% and about 94.2%, respectively. That is, the power conversion efficiency was enhanced both when the voltage VAC was 100 V and when it was 230 V. In addition, this result shows that the efficiency was enhanced particularly when the AC input voltage VAC was 230 V.

Furthermore, the result of FIG. 7 reveals that the AC to DC power conversion efficiencies ηAC→DC for intermediate loads (the load power Po was from 100 W to 180 W) were 90.0% or more both when the AC input voltage VAC was 100 V and when it was 230 V.

From a comparison between the AC to DC power conversion efficiency shown in FIG. 7 and that of the power supply circuit in FIG. 12 including a conventional complex resonant converter, it was found that the power supply circuit of the present embodiment in FIG. 1 improved by 10% or more its AC to DC power conversion efficiency when the load power Po was 100 W or larger, over the circuit of FIG. 12.

Moreover, it was also found that the AC input power Pin when the load power Po was the minimum load power (0 W) was reduced to half or lower compared with the power supply circuit of FIG. 12.

The switching frequency fs has a tendency of rising up as a load becomes lighter both when the AC input voltage VAC is 100 V and when it is 230 V, as shown in the drawing.

According to the experiments, the requisite control range Δfs of the switching frequency fs for addressing variation in the load power Po from 200 W to 0 W was found to be about 21.5 kHz and about 11.3 kHz when the AC input voltage VAC was 100 V and when it was 230 V, respectively.

These small requisite control ranges Δfs allow the present embodiment to achieve a wide-range compatible configuration that can operate compatibly with variation ranges of the load power Po from 200 W to 0 W and the AC input voltage VAC from 85 V and 264 V.

In addition, the requisite control range Δfs for each single range is significantly reduced compared with the requisite control range Δfs of the power supply circuit in FIG. 12. Thus, in the present embodiment, the responsivity of constant-voltage control can be enhanced, which allows more adequate stabilization of the secondary-side DC output voltage Eo.

Figure 8:
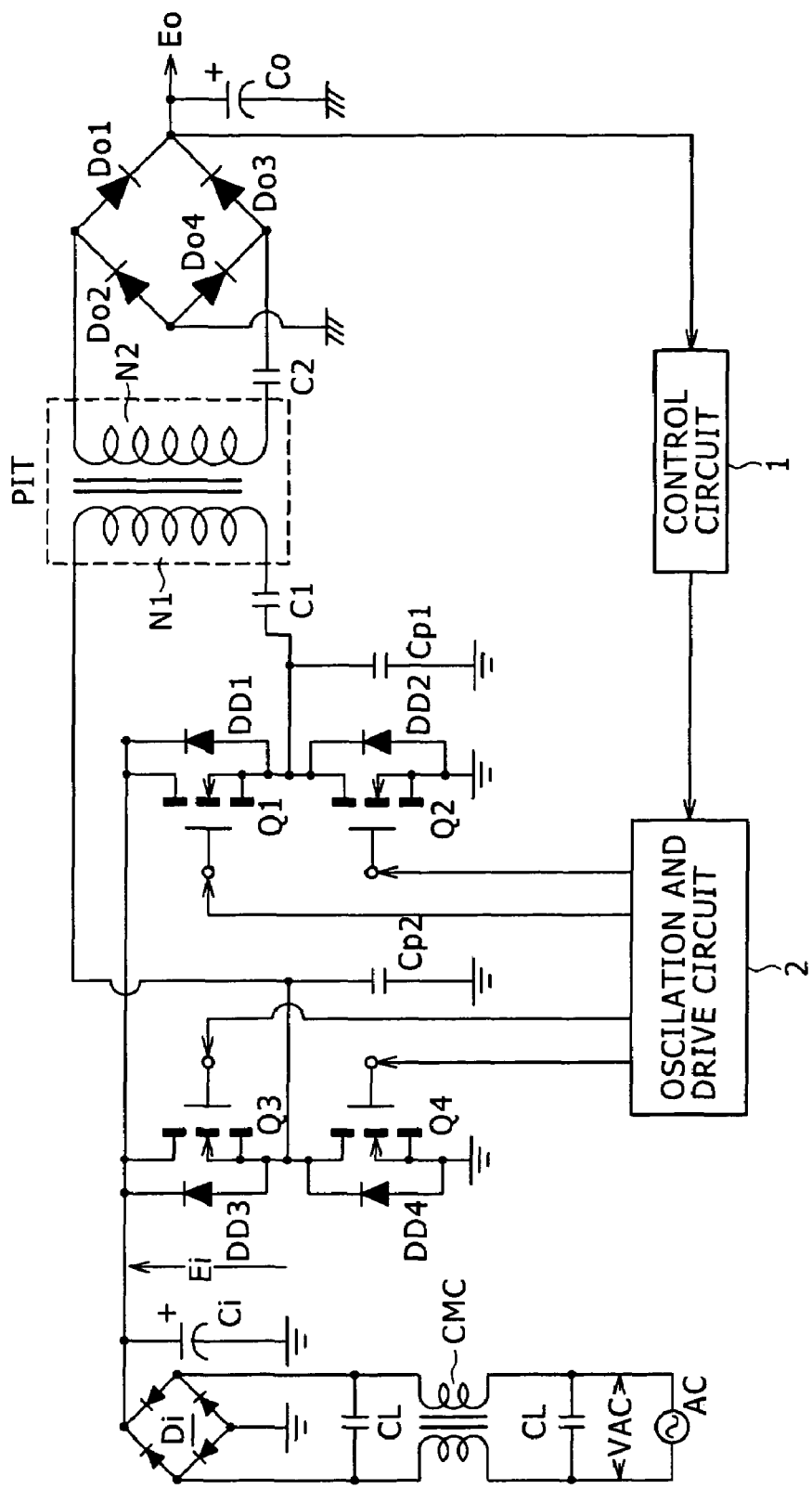
FIG. 8 is a circuit diagram illustrating the configuration of a switching power supply circuit according to a second embodiment of the invention.

FIG. 8 is a circuit diagram illustrating the configuration of a switching power supply circuit as a second embodiment of the present invention.

The second embodiment in FIG. 8 employs full-bridge connection as the configuration of its switching converter, instead of half-bridge connection.

The same parts in FIG. 8 as those in FIG. 1 are given the same numerals, and description thereof will be omitted.

Referring to FIG. 8, in the full-bridge connection configuration, the half-bridge connected switching elements Q1 and Q2 are connected in parallel with half-bridge connected switching elements Q3 and Q4.

Damper diodes DD3 and DD4 that are body diodes are connected in parallel with the channel between the drain and source of the switching elements Q3 and Q4, respectively, similarly to the switching elements Q1 and Q2.

In addition, these full-bridge connected switching elements are coupled as follows to a primary-side series resonant circuit formed by connecting in series the primary winding N1 of the isolation converter transformer PIT and the primary-side series resonant capacitor C1.

Also in the second embodiment, the switching output node between the switching element Q1 and the switching element Q2 is connected in series to the primary-side series resonant capacitor C1, and is coupled via the capacitor C1 to one end of the primary winding N1 similarly to FIG. 1. In the second embodiment, instead of the capacitor Cp in FIG. 1, a primary-side partial resonant capacitor Cp1 is connected in parallel with the switching element Q2 as shown in the drawing.

The other end of the primary winding N1 is coupled to the connecting node between the source of the switching element Q3 and the drain of the switching element Q4 as shown in FIG. 8, instead of being connected to the primary-side ground like the circuit of FIG. 1. The connecting node between the source of the switching element Q3 and the drain of the switching element Q4 serves as another switching output node in the full-bridge connected switching circuit system.

In addition, a primary-side partial resonant capacitor Cp2 is connected in parallel with the channel between the source and drain of the switching element Q4. The capacitance of the primary-side partial resonant capacitor Cp2 and the leakage inductance L1 of the primary winding N1 form a parallel resonant circuit (partial voltage resonant circuit), which offers partial voltage resonant operation in which voltage resonance arises only when the switching elements Q3 and Q4 are turned off.

The oscillation and drive circuit 2 drives these switching elements Q1 to Q4 made of four transistors. The oscillation and drive circuit 2 implements switching driving so that the pair of the switching elements Q1 and Q4 and the pair of the switching elements Q2 and Q3 are alternately turned on/off.

As the load becomes heavier, a current flowing through the switching converter increases and the burden on the circuit parts becomes heavier. Furthermore, the power loss also increases. If, in order to address this problem, full-bridge connection is employed like the second embodiment, the requisite load current is covered by four switching elements. Therefore, compared with a half-bridge connection configuration formed of two switching elements for example, the burden on the parts becomes lighter and the power loss decreases, which offers advantages for a heavy load condition.

It should be noted, for confirmation, that also in the second embodiment, a series resonant circuit is formed both on the primary and secondary sides, and the coupling coefficient k between the primary and secondary sides of the isolation converter transformer PIT is decreased to such an extent that a unimodal output characteristic is obtained. Therefore, the requisite control range Δfs of the switching frequency for addressing load variation and AC input voltage variation is narrowed, and thus a wide-range compatible configuration is achieved while enhancing the responsivity of constant-voltage control.

In addition, also in the second embodiment, the coupling coefficient k between the primary and secondary sides of the isolation converter transformer PIT is set to about 0.8 or lower, and the primary-side resonant frequency fo1 and the secondary-side resonant frequency fo2 are designed to have the above-described relationship. Accordingly, the power conversion efficiency is enhanced when a large AC input voltage is employed in particular.

Moreover, also in the second embodiment, a rectifier circuit other than a full-wave center-tap rectifier circuit (and half-wave rectifier circuit) is used as the secondary-side rectifier circuit in order to offer resonant operation as the rectifying operation on the secondary side, which can avoid the occurrence of bias magnetization in the isolation converter transformer PIT.

That is, the power supply circuit of FIG. 8 can offer similar advantages to those the circuit of FIG. 1 as well as advantages for a heavy load condition over the power supply circuit of FIG. 1.

Figure 9:
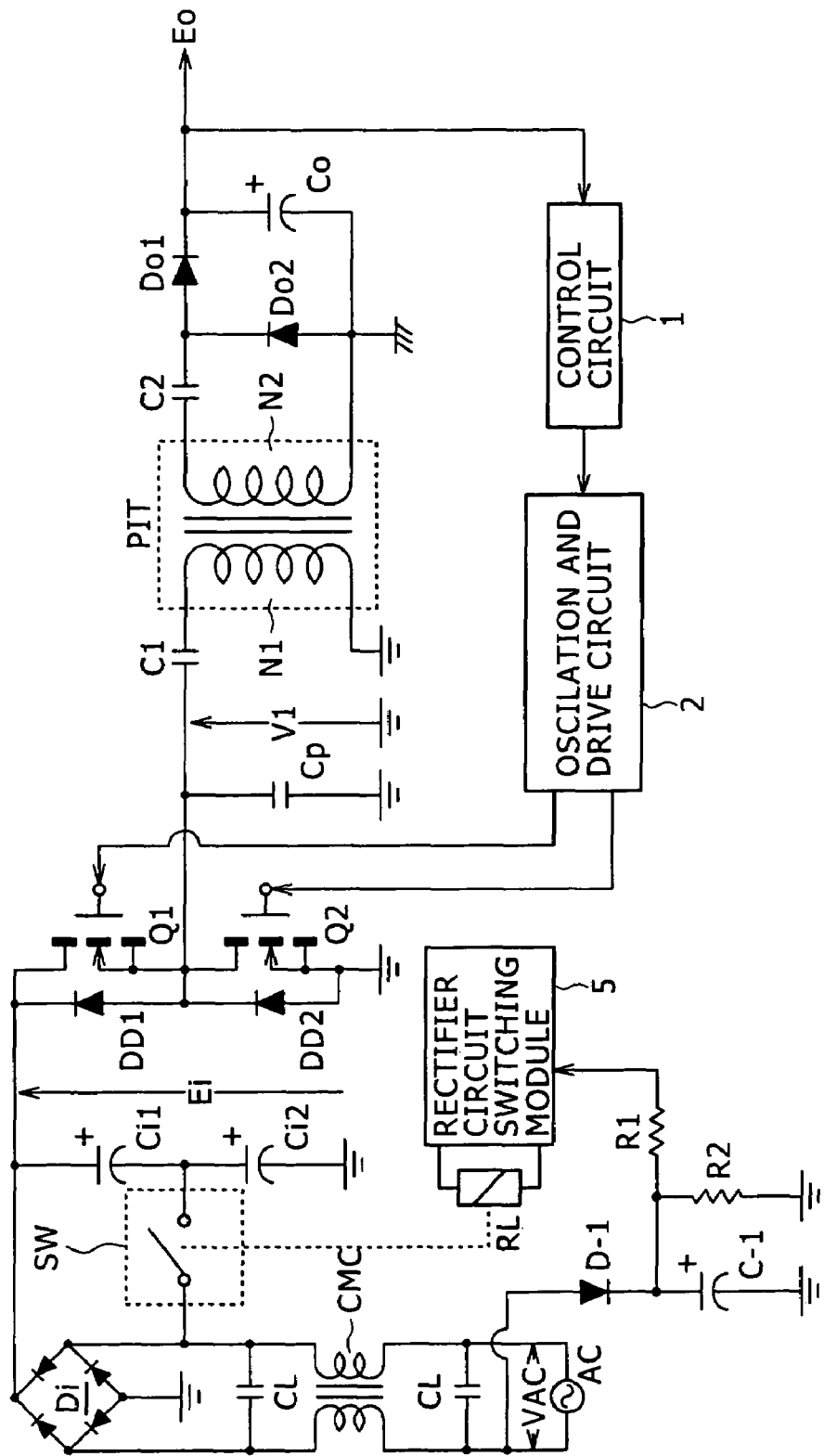
FIG. 9 is a circuit diagram illustrating the configuration of a switching power supply circuit according to a third embodiment of the invention.

FIG. 9 is a circuit diagram illustrating the configuration of a switching power supply circuit as a third embodiment of the present invention.

The same parts in FIG. 9 as those in FIG. 1 are given the same numerals and will not be described below.

The third embodiment employs a configuration for switching the operation of the primary-side rectifier circuit between full-wave rectifying operation and voltage-doubling rectifying operation depending on the rated voltage of a commercial AC power supply. In addition, a voltage-doubler half-wave rectifier circuit is provided as the secondary-side rectifying and smoothing circuit.

On the primary side, a circuit formed of a smoothing capacitor Ci1 and a smoothing capacitor Ci2 that are serially connected is provided as the smoothing capacitor Ci that smoothes a rectified output from the bridge rectifier circuit Di provided for the commercial alternating-current power supply AC to thereby produce the rectified and smoothed voltage Ei. The connecting node between the smoothing capacitors Ci1 and Ci2 is coupled via a relay switch SW to one line (in this embodiment, negative line) of the commercial power supply AC, at the subsequent stage of a common mode noise filter (the filter capacitors CL, and the common mode choke coil CMC).

A rectifier circuit switching module 5 is provided in order to control on/off of the relay switch SW. By a half-wave rectifying and smoothing circuit formed of a rectifier diode D-1 and a smoothing capacitor C-1, and voltage dividing resistors R1 and R2, the level of voltage from the commercial power supply AC is detected and input to the rectifier circuit switching module 5.

Specifically, the half-wave rectifying and smoothing circuit produces a rectified and smoothed voltage from the voltage generated by the commercial power supply AC. The DC voltage level depending on the rectified and smoothed voltage is then detected at the dividing point between the voltage dividing resistors R1 and R2, followed by being input to the rectifier circuit switching module 5.

In accordance with the thus detected and input level of the voltage from the commercial power supply AC, the rectifier circuit switching module 5 controls on/off of a relay RL to thereby control on/off of the relay switch SW. Specifically, when an AC 100 V-system input is employed and therefore the detected and input voltage level from the commercial power supply AC is 150 V or lower for example, the relay RL is turned on and thus the relay switch SW is turned on. In contrast, when an AC 200 V-system input is employed and therefore the detected and input voltage level from the commercial power supply AC is 150 V or more for example, the relay RL is turned off and thus the relay switch SW is turned off.

According to the operation of the rectifier circuit switching module 5, when an AC 100 V-system input is used, the turning on of the relay switch SW couples the connecting node between the smoothing capacitors Ci1 and Ci2 with the one line (negative line) of the commercial power supply AC. This coupling provides operation in which a rectified current is charged in either of the smoothing capacitors Ci1 and Ci2 alternately in each half cycle of the voltage from the commercial power supply AC. Thus, when the AC 100 V-system is used, voltage-doubling rectifying operation is achieved in which the rectified and smoothed voltage Ei having the level equal to twice that of the voltage from the commercial power supply AC is generated across the serially connected smoothing capacitors Ci1 and Ci2.

In contrast, when the AC 200 V-system is used, the turning off of the relay switch SW decouples the connecting node between the smoothing capacitors Ci1 and Ci2 from the one line of the commercial power supply AC. This decoupling provides operation in which a rectified current is charged in the circuit of the serially connected smoothing capacitors Ci1 and Ci2 in each half cycle of the voltage from the commercial power supply AC. That is, normal full-wave rectifying operation is achieved in which the rectified and smoothed voltage Ei having the same level as that of the voltage from the commercial power supply AC is generated across the smoothing capacitors Ci1 and Ci2.

This switch over of the rectifying operation in the circuit of FIG. 9 results in the rectified and smoothed voltage Ei that has the same level both when the AC 100 V-system is employed and when the AC 200 V-system is employed. Since the rectified and smoothed voltage Ei having the same level both when the AC 100 V-system is employed and when the AC 200 V-system is employed is thus produced, variation in the input voltage to the switching converter, for addressing both inputs of the AC 100 V-system and the AC 200 V-system, is suppressed. Thus, further narrowing of the requisite control range Δfs of the switching frequency is allowed.

The power supply circuit in FIG. 9 includes, as a voltage-doubler half-wave rectifier circuit on the secondary side, the rectifier diodes Do1 and Do2, the secondary-side series resonant capacitor C2, and the smoothing capacitor Co. The connecting configuration thereof is as follows. The anode of the rectifier diode Do1 is connected in series to the secondary-side series resonant capacitor C2, and is coupled via the capacitor C2 to one end of the secondary winding N2. The cathode of the rectifier diode Do1 is connected to the positive electrode of the smoothing capacitor Co.

The negative electrode of the smoothing capacitor Co is coupled to the connecting node between the other end of the secondary winding N2 and the secondary-side ground. The anode of the rectifier diode Do2 is coupled to the connecting node between the other end of the secondary winding N2 and the secondary-side ground. The cathode of the rectifier diode Do2 is coupled to the connecting node between the secondary-side series resonant capacitor C2 and the anode of the rectifier diode Do1.

In this voltage-doubler half-wave rectifier circuit, in the periods of one half cycles of the alternating voltage excited in the secondary winding N2, the rectifier diode Do2 becomes conductive to charge a rectified current in the secondary-side series resonant capacitor C2. Thus, generated across the secondary-side series resonant capacitor C2 is a voltage with the same level as that of the alternating voltage excited in the secondary winding N2.

In the periods of the other half cycles, the rectifier diode Do1 becomes conductive, and the smoothing capacitor Co is charged by the alternating voltage arising in the secondary winding N2 and the voltage generated across the secondary-side series resonant capacitor C2.

Thus, generated across the smoothing capacitor Co is the secondary-side DC output voltage Eo having the level equal to twice that of the alternating voltage excited in the secondary winding N2. Since the smoothing capacitor Co is charged only in the periods of one half cycles of the alternating voltage excited in the secondary winding N2, this rectifying operation is voltage-doubling half-wave rectifying operation.

If a voltage-doubler half-wave rectifier circuit is employed as the secondary-side rectifier circuit as described above, the number of turns of the secondary winding N2 for obtaining the same level of the secondary-side DC output voltage Eo as that in the circuit of FIG. 1 can be reduced to half the number of turns of the secondary winding N2 in FIG. 1. This reduction of turn number of the secondary winding N2 can decrease the size of the isolation converter transformer PIT.

The configuration in FIG. 9 also has the same settings of the coupling coefficient k and the resonant frequencies fo1 and fo2 as those in FIG. 1, and therefore achieves the same advantages. In addition, the configuration in FIG. 9 also includes as its secondary-side rectifier circuit, a rectifier circuit other than a full-wave center-tap rectifier circuit. Therefore, a problem associated with bias magnetization in the isolation converter transformer PIT can be prevented.

Figure 10:
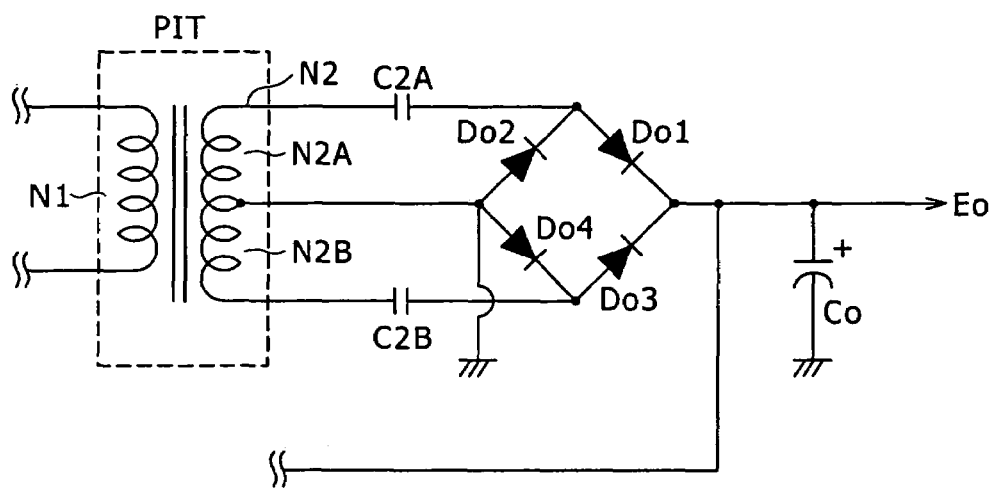
FIG. 10 is a circuit diagram illustrating the configuration of a switching power supply circuit according to a fourth embodiment of the invention.

FIG. 10 illustrates the configuration of a switching power supply circuit according to a fourth embodiment of the invention.

The fourth embodiment includes a voltage-doubler full-wave rectifier circuit as its secondary-side rectifying and smoothing circuit.

Note that FIG. 10 illustrates only the secondary-side configuration of the power supply circuit, and any of the configurations in FIGS. 1, 8 and 9 is available as the primary-side configuration thereof.

Referring to FIG. 10, in the voltage-doubler full-wave rectifier circuit, the center tap of the secondary winding N2 is connected to the secondary-side ground, which divides the secondary winding N2 into the secondary winding portion N2A and the secondary winding portion N2B. One end (the end of the secondary winding portion N2A) of the secondary winding N2 is connected in series to a secondary-side series resonant capacitor C2A. The other end (the end of the secondary winding portion N2B) is connected in series to a secondary-side series resonant capacitor C2B. Thus, the secondary winding portion N2A and the secondary-side series resonant capacitor C2A form one secondary-side series resonant circuit. The secondary winding portion N2B and the secondary-side series resonant capacitor C2B form another secondary-side series resonant circuit.

Furthermore, coupled to the entire secondary winding N2 is a bridge rectifier circuit having the same connecting configuration as that of the bridge rectifier circuit in FIG. 1.

Specifically, the one end of the secondary winding N2 is coupled via the secondary-side series resonant capacitor C2A to the connecting node between the anode of the rectifier diode Do1 and the cathode of the rectifier diode Do2. The other end of the secondary winding N2 is coupled via the secondary-side series resonant capacitor C2B to the connecting node between the anode of the rectifier diode Do3 and the cathode of the rectifier diode Do4.

The connecting node between the cathode of the rectifier diode Do1 and the cathode of the rectifier diode Do3 is connected to the positive electrode of the smoothing capacitor Co. The negative electrode of the smoothing capacitor Co is connected to the secondary-side ground.

The connecting node between the rectifier diodes Do2 and Do4 is coupled to the connecting node between the center tap of the secondary winding N2 and the secondary-side ground, and thus is connected to the secondary side ground.

In the voltage-doubler full-wave rectifier circuit with the above-described connecting configuration, in the periods of one half cycles of the alternating voltage excited in the secondary winding N2, a rectified current flows cyclically through the secondary winding portion N2A, the rectifier diode Do2, the secondary-side series resonant capacitor C2A, and the secondary winding portion N2A in that order. In contrast, in the periods of the other half cycles of the alternating voltage excited in the secondary winding N2, a rectified current flows cyclically through the secondary winding portion N2B, the rectifier diode Do4, the secondary-side series resonant capacitor C2B, and the secondary winding portion N2B in that order. That is, a DC voltage having the same level as that of the alternating voltage excited in the secondary winding portions N2A and N2B is obtained across the secondary-side series resonant capacitors C2A and C2B, respectively, in the respective corresponding half cycle periods.

In addition, in the periods of the one half cycles of the alternating voltage excited in the secondary winding N2, the rectified current is branched from the above-described cycling path, and flows also through the secondary winding portion N2B, the secondary-side series resonant capacitor C2B, the rectifier diode Do3, and the smoothing capacitor Co in that order.

Thus, in the periods of the one half cycles, the smoothing capacitor Co is charged by the voltage resulting from superposition of the alternating voltage in the secondary winding portion N2B and the voltage generated across the secondary-side series resonant capacitor C2B. That is, the voltage across the smoothing capacitor Co has the level equal to twice that of the alternating voltage arising in the secondary winding portion.

Moreover, in the periods of the other half cycles of the alternating voltage excited in the secondary winding N2, the rectified current is branched from the above-described cycling path, and flows also through the secondary winding portion N2A, the secondary-side series resonant capacitor C2A, the rectifier diode Do1, and the smoothing capacitor Co in that order. Therefore, also in this case, the voltage across the smoothing capacitor Co has the level equal to twice that of the alternating voltage arising in the secondary winding portion, due to the alternating voltage in the secondary winding portion N2A and the voltage across the secondary-side series resonant capacitor C2A.

According to this rectifying operation, the rectifier circuit performs such operation that the smoothing capacitor Co is charged in each half cycle of the alternating voltage arising in the secondary winding N2. The voltage across the smoothing capacitor Co has the level equal to twice that of the alternating voltage excited in the secondary winding portion as described above.

Thus, voltage-doubling full-wave rectifying operation is achieved.

The configuration in FIG. 10 also has the same settings of the coupling coefficient k and the resonant frequencies fo1 and fo2 as those in FIG. 1, and therefore achieves the same advantages. In addition, the configuration in FIG. 10 also includes as its secondary-side rectifier circuit, a rectifier circuit other than a full-wave center-tap rectifier circuit. Therefore, a problem associated with bias magnetization in the isolation converter transformer PIT can be prevented.

Figure 11:
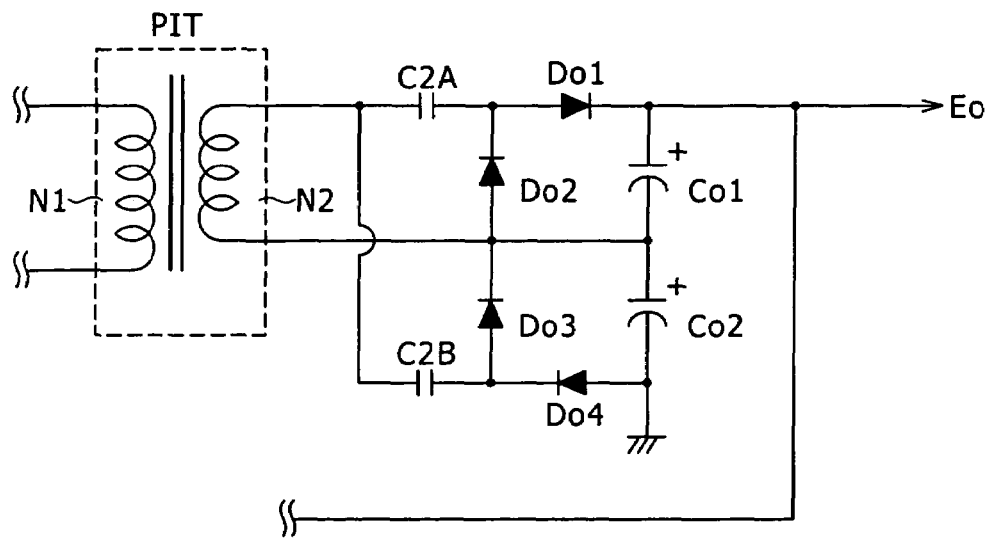
FIG. 11 is a circuit diagram illustrating the configuration of a switching power supply circuit according to a fifth embodiment of the invention.

FIG. 11 illustrates the configuration of a switching power supply circuit according to a fifth embodiment of the invention.

Note that also in the power supply circuit, any of the configurations in FIGS. 1, 8 and 9 is available as the primary-side configuration thereof, and therefore FIG. 11 omits illustration of the primary side.

The fifth embodiment includes a voltage-quadrupler rectifier circuit as its secondary-side rectifying and smoothing circuit.

The voltage-quadrupler rectifier circuit includes four rectifier diodes Do1 to Do4, the secondary-side series resonant capacitors C2A and C2B, and smoothing capacitors Co1 and Co2.

One end of the secondary winding N2 is coupled in series via the secondary-side series resonant capacitor C2A and the rectifier diode Do1 (coupled to the anode thereof), to the positive electrode of the smoothing capacitor Co1. The negative electrode of the smoothing capacitor Co1 is coupled to the other end of the secondary winding N2.

The positive electrode of the smoothing capacitor Co2 is coupled to the connecting node between the negative electrode of the smoothing capacitor Co1 and the other end of the secondary winding N2. The negative electrode of the smoothing capacitor Co2 is connected to the secondary-side ground.

Interposed between the one end of the secondary winding N2 and the secondary-side ground is the circuit formed of the rectifier diode Do4 and the secondary-side series resonant capacitor C2B serially connected to the cathode of the rectifier diode Do4.

The anode of the rectifier diode Do3 is coupled to the connecting node between the secondary-side series resonant capacitor C2B and the rectifier diode Do4. The cathode of the rectifier diode Do3 is coupled to the connecting node between the connecting node of the smoothing capacitors Co1 and Co2, and the other end of the secondary winding N2.

The anode of the rectifier diode Do2 is coupled to the connecting node between the cathode of the rectifier diode Do3 and the other end of the secondary winding N2. The cathode of the rectifier diode Do2 is coupled to the connecting node between the secondary-side series resonant capacitor C2A and the rectifier diode Do1.

In the voltage-quadrupler rectifier circuit with the above-described connecting configuration, in the periods of one half cycles of the alternating voltage excited in the secondary winding N2, a rectified current flows cyclically through the secondary winding N2, the rectifier diode Do2, the secondary-side series resonant capacitor C2A, and the secondary winding N2 in that order. Similarly, in the periods of the other half cycles of the alternating voltage, a rectified current flows cyclically through the secondary winding N2, the secondary-side series resonant capacitor C2B, the rectifier diode Do3, and the secondary winding N2 in that order.

That is, a DC voltage having the same level as that of the alternating voltage excited in the secondary winding N2 is obtained across the secondary-side series resonant capacitors C2A and C2B, in the respective corresponding half cycle periods.

Also in this case, in the respective half cycle periods, the rectified current is branched from the above-described cycling path, and flows also through the following path.

In the periods of the one half cycles of the alternating voltage, the rectified current is branched and flows also through the smoothing capacitor Co2, the rectifier diode Do4, the secondary-side series resonant capacitor C2B, and the secondary winding N2 in that order. In these periods, the secondary-side series resonant capacitor C2B has been charged in advance by the current flowing through the previously described cycling path. Thus, due to the branched current path, the smoothing capacitor Co2 is charged by the voltage resulting from superposition of the alternating voltage arising in the secondary winding N2 and the voltage across the secondary-side series resonant capacitor C2B.

Accordingly, generated across the secondary-side series resonant capacitor Co2 is a voltage with the level equal to twice that of the alternating voltage excited in the secondary winding N2.

In the periods of the other half cycles of the alternating voltage, the rectified current is branched and flows also through the secondary-side series resonant capacitor C2A, the rectifier diode Do1, the smoothing capacitor Co1, and the secondary winding N2 in that order. Thus, the smoothing capacitor Co1 is charged by the voltage resulting from superposition of the alternating voltage arising in the secondary winding N2 and the voltage across the secondary-side series resonant capacitor C2A, generated due to the previously described cycling path.

Accordingly, the voltage across the smoothing capacitor Co1 has the level equal to twice that of the alternating voltage arising in the secondary winding N2.

In this manner, a DC voltage with the level equal to twice that of the alternating voltage excited in the secondary winding N2 is generated both across the smoothing capacitor Co1 and across the smoothing capacitor Co2. As a result, generated across the circuit formed of the serially connected smoothing capacitors Co1 and Co2 is the secondary-side DC output voltage Eo having the level equal to four times that of the alternating voltage excited in the secondary winding N2.

Since the fifth embodiment includes a voltage-quadrupler rectifier circuit as its secondary-side rectifier circuit, the number of turns of the secondary winding N2 can further be decreased, which can further reduce the size of the isolation converter transformer PIT.

In addition, the fifth embodiment also has the same settings of the coupling coefficient k and the resonant frequencies fo1 and fo2 as those in FIG. 1, and therefore achieves the same advantages. Moreover, since the fifth embodiment also includes as its secondary-side rectifier circuit, a rectifier circuit other than a full-wave center-tap rectifier circuit, a problem associated with bias magnetization in the isolation converter transformer PIT can be prevented.

It should be noted that the invention is not limited to the above-described configurations of the embodiments.

For example, an element other than a MOS-FET, such as an IGBT (Insulated Gate Bipolar Transistor), may be used as the switching element as long as the element is separately excited. Furthermore, the above-described constant of each part element may be changed according to actual conditions and so forth.

Moreover, the wide-range compatible configuration according to the embodiments of the present invention can also be applied to self-excited current resonant converters.

It should be understood by those skilled in the art that various modifications, combinations, sub-combinations and alterations may occur depending on design requirements and other factors insofar as they are within the scope of the appended claims or the equivalents thereof.

The invention claimed is:

1. A switching power supply circuit, comprising:
a switching unit formed of two switching elements at least connected to each other, said switching unit receiving a direct-current (DC) input voltage and performs a switching operation, the switching operation resulting in a switching output;
a switching drive unit that drives the switching elements alternately turning on and off to perform the switching operation with the same cycle;
an isolation converter transformer having a core with a primary winding on a primary side and a secondary winding on a secondary side, the primary winding being supplied with the switching output of the switching operation, and the secondary winding having an alternating voltage induced therein by the primary winding;
a primary-side series resonant circuit including a leakage inductance component of the primary winding and a capacitance of a primary-side series resonant capacitor connected in series with the primary winding, said primary-side series resonant circuit connected to a connecting node of said two switching elements, said primary-side series resonant circuit for producing a first resonant frequency for making the switching unit operate on a current resonant basis;
a secondary-side series resonant circuit including a leakage inductance component of the secondary winding and a capacitance of a secondary-side series resonant capacitor connected in series with the secondary winding for producing a second resonant frequency;
a secondary-side rectifying and smoothing unit that rectifies the alternating voltage induced in the secondary winding to produce a rectified voltage, and that smoothes the rectified voltage using a secondary-side smoothing capacitor to thereby produce a secondary-side DC output voltage; and a constant-voltage control unit that performs constant-voltage control of the secondary-side DC output voltage by controlling the switching drive unit according to a level of the secondary-side DC output voltage to thereby vary a switching frequency of the switching unit;

the primary-side series resonant circuit and the secondary-side series resonant circuit forming an electro-magnetically coupled resonant circuit, wherein the core of the isolation converter transformer has a gap formed in a predetermined position between the primary side and the secondary side, the gap having a length selected so that the electro-magnetically coupled resonant circuit has a unimodal output characteristic with respect to the input of a frequency signal having the switching frequency; and the first resonant frequency and the second resonant frequency are set so that a required phase shift arises between a primary-side series resonant current flowing through the primary-side series resonant circuit and a secondary-side rectified current flowing through the secondary side of the isolation converter transformer.

2. The switching power supply circuit according to claim 1, further comprising:

a rectifying and smoothing unit that rectifies and smoothes an alternating-current (AC) input voltage to obtain the DC input voltage, wherein the first resonant frequency and the second resonant frequency are set so that a required phase shift arises between the primary-side series resonant current and the secondary-side rectified current at least when the AC input voltage is 100 V and load power is the maximum load power.

3. The switching power supply circuit according to claim 1, wherein the switching unit is formed of four switching elements that are connected to each other by a full-bridge connection.

4. The switching power supply circuit according to claim 2, further comprising:

a switch-over unit that switches the rectifying operation of the rectifying and smoothing unit between a full-wave rectifying operation and a voltage-doubling rectifying operation depending on the level of the AC input voltage.

5. The switching power supply circuit according to claim 1, wherein the secondary-side rectifying and smoothing unit includes a bridge rectifier circuit to thereby implement a full-wave rectifying operation.

6. The switching power supply circuit according to claim 1, wherein the secondary-side rectifying and smoothing unit includes a voltage-doubler rectifier circuit that charges the secondary-side series resonant capacitor or the secondary-side smoothing capacitor in each half cycle of the alternating voltage induced in the secondary winding, and produces the secondary-side DC output voltage having a level equal to twice the level of the alternating voltage.

7. The switching power supply circuit according to claim 1, wherein the secondary winding includes a tap dividing the secondary winding into a first secondary winding part having an end and a second secondary winding part having an end, each of the ends being coupled to the secondary-side series resonant capacitor; and the secondary-side rectifying and smoothing unit includes a voltage-doubler full-wave rectifier circuit that charges the secondary-side series resonant capacitor or the secondary-side smoothing capacitor in each half cycle of the alternating voltage induced in the divided secondary winding, and produces a secondary-side DC output voltage having a level equal to twice the level of the alternating voltage.

8. The switching power supply circuit according to claim 1, wherein one end of the secondary winding is coupled to the secondary-side series resonant capacitor; and the secondary-side rectifying and smoothing unit includes a voltage-quadrupler rectifier circuit that charges the secondary-side series resonant capacitor or the secondary-side smoothing capacitor in each half cycle of the alternating voltage induced in the secondary winding, and produces a secondary-side DC output voltage having a level equal to four times the level of the alternating voltage induced in the secondary winding.

* * * * *